(12) United States Patent
Seong et al.

(10) Patent No.: US 10,162,898 B2
(45) Date of Patent: Dec. 25, 2018

(54) METHOD AND APPARATUS FOR SEARCHING

(71) Applicant: SAMSUNG ELECTRONICS CO., LTD., Suwon-si (KR)

(72) Inventors: Young-ah Seong, Seoul (KR); Yong-ho Kim, Seoul (KR); Gi-ppeum Choi, Suwon-si (KR); Chul-ho Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 315 days.

(21) Appl. No.: 14/958,439

(22) Filed: Dec. 3, 2015

(65) Prior Publication Data

US 2016/0162584 A1 Jun. 9, 2016

(30) Foreign Application Priority Data

Dec. 3, 2014 (KR) .................. 10-2014-0172377

(51) Int. Cl.
*G06F 17/00* (2006.01)
*G06F 17/30* (2006.01)

(52) U.S. Cl.
CPC .. *G06F 17/30867* (2013.01); *G06F 17/30026* (2013.01)

(58) Field of Classification Search
CPC .. G06F 3/0482; G06F 3/04883; G06F 9/4443; G06F 2203/04803; G06F 3/04817
See application file for complete search history.

(56) References Cited

U.S. PATENT DOCUMENTS

| | | | |
|---|---|---|---|
| 9,110,587 B2 | 8/2015 | Kim et al. | |
| 2012/0078896 A1* | 3/2012 | Nixon | G06F 17/30943 707/732 |
| 2012/0144422 A1 | 6/2012 | Han | |
| 2013/0007665 A1 | 1/2013 | Chaudhri et al. | |
| 2013/0179173 A1 | 7/2013 | Lee et al. | |
| 2014/0068638 A1 | 3/2014 | Seo | |
| 2015/0254359 A1* | 9/2015 | Webster | G06F 17/30864 707/722 |

FOREIGN PATENT DOCUMENTS

| | | |
|---|---|---|
| KR | 10-2012-0061577 A | 6/2012 |
| KR | 10-2013-0082339 A | 7/2013 |
| KR | 10-2014-0019206 A | 2/2014 |
| KR | 10-2014-0025552 A | 3/2014 |
| KR | 10-2014-0031587 A | 3/2014 |
| KR | 10-1376032 B1 | 3/2014 |

* cited by examiner

*Primary Examiner* — Truong V Vo
(74) *Attorney, Agent, or Firm* — Sughrue Mion, PLLC

(57) ABSTRACT

A terminal includes a first input interface configured to acquire first search information of a first data type, and a second input interface configured to acquire second search information of a second data type, the first data type being different from the second data type. The terminal further includes a searcher configured to identify whether search information is acquired from at least one among the first input interface and the second input interface, and acquire a search result from data storage based on the search information, in response to the searcher identifying that the search information is acquired from at least one among the first input interface and the second input interface. The terminal further includes an output interface configured to provide the search result.

17 Claims, 40 Drawing Sheets

| DATE | SCHEDULE |
|---|---|
| NOVEMBER 3RD | |
| NOVEMBER 4TH | |
| NOVEMBER 5TH | 6:30 P.M. DENTIST |
| NOVEMBER 6TH | 7 P.M. COMPANY DINNER — 2701 |
| NOVEMBER 7TH | 8 P.M. HIGH SCHOOL REUNION |
| NOVEMBER 8TH | 10 A.M. MOUNTAIN CLIMBING |
| NOVEMBER 9TH | |

METHOD AND APPARATUS FOR SEARCHING

CROSS-REFERENCE TO RELATED APPLICATION

This application claims priority from Korean Patent Application No. 10-2014-0172377, filed on Dec. 3, 2014, in the Korean Intellectual Property Office, the disclosure of which is incorporated herein by reference in its entirety.

BACKGROUND

1. Field

Methods and apparatuses consistent with exemplary embodiments relate to a method and an apparatus for searching.

2. Description of the Related Art

Mobile terminals are portable devices having at least one selected from an audio and video communication function, an information input/output function, and a data storage function.

Along with the development of telecommunication technology and the increasing demands of users, functions of mobile terminals have become more complicated and varied. For example, mobile terminals may be provided as multifunctional multimedia devices capable of capturing photographs and videos, playing music, video files, and games, and receiving broadcasts. Also, various messaging services are provided via mobile terminals, for example, a text messaging service, i.e., a short message service (SMS), and a multimedia message service (MMS).

Due to the recent development of wireless Internet and telecommunication, mobile terminals may be used to search for information. To search for information by using a mobile terminal, a user may have to wirelessly access a search site on the Internet that transmits an extensive amount of information, and input keywords related to an object of interest on the search website. The user may also spend a considerable amount of time to find useful information from a search result.

Therefore, a method and an apparatus for providing various search results based on search information that is input by a user may be developed.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a terminal capable of receiving search various data types of information, and providing various search results by using search engines or applications based on the data types.

One or more exemplary embodiments provide a terminal capable of receiving search information, and providing search results received from a plurality of search engines or applications.

One or more exemplary embodiments provide a non-transitory computer-readable recording medium having recorded thereon a program, which, when executed by a computer, performs a search method.

According to an aspect of an exemplary embodiment, there is provided a terminal including a first input interface configured to acquire first search information of a first data type, and a second input interface configured to acquire second search information of a second data type, the first data type being different from the second data type. The terminal further includes a searcher configured to identify whether search information is acquired from at least one among the first input interface and the second input interface, and acquire a search result from data storage based on the search information, in response to the searcher identifying that the search information is acquired from at least one among the first input interface and the second input interface. The terminal further includes an output interface configured to provide the search result.

The searcher may be further configured to acquire search start information from at least one among the first input interface and the second input interface, and acquire the search information from at least one among the first input interface and the second input interface based on the search start information.

The searcher may be further configured to, in response to the search start information instructing to acquire the search information from the first input interface, acquire the search information from the first input interface, and in response to the search start information instructing to acquire the search information from the second input interface, acquire the search information from the second input interface.

The searcher may be further configured to acquire the search result, using an application corresponding to a data type of the search information.

The searcher may be further configured to convert the search information to other search information having another data type different from the data type of the search information, and acquire another search result, using another application corresponding to the other data type of the other search information.

The output interface may be further configured to provide the search result acquired using the application corresponding to the data type of the search information, and provide the other search result acquired using the other application corresponding to the other data type of the other search information.

A data type of the search information may include at least one among text data, audio data, video data, and still image data.

The data storage may include a server, and the terminal may further include a communicator configured to receive, from the server, the search result acquired based on the search information.

The searcher may be further configured to determine an application based on at least one among a category of the search information and user information of the terminal, and acquire the search result, using the determined application.

The user information may include at least one among location information of the terminal, search time information, and usage frequency information of the application.

The searcher may be further configured to determine data to be used to acquire the search result, among data in the data storage, based on a mode of the terminal, and acquire the search result from the determined data.

The mode may include at least one among a user mode, a guest mode, a terminal lock mode, and a network use mode.

The searcher may be further configured to acquire the search result from public information, in response to the mode of the terminal being the guest mode.

The searcher may be further configured to control the output interface to provide the search result, using at least one among search result history information, search result information of another user other than a user of the terminal, previously-used application information, user preference information of the terminal, and user schedule information of the terminal.

According to an aspect of another exemplary embodiment, there is provided a method of searching in a terminal, the method including identifying whether search information is acquired from at least one among a first input interface acquiring first search information of a first data type and a second input interface acquiring second search information of a second data type, the first data type being different from the second data type. The method further includes acquiring a search result from data storage based on the search information, in response to the identifying that the search information is acquired from at least one among the first input interface and the second input interface, and providing the search result.

The method may further include acquiring search start information from at least one among the first input interface and the second input interface, and acquiring the search information from at least one among the first input interface and the second input interface based on the search start information.

The acquiring the search result may include acquiring the search result, using an application corresponding to a data type of the search information.

The method may further include converting the search information to other search information having another data type different from the data type of the search information, and acquiring another search result, using another application corresponding to the other data type of the other search information.

The data storage may include a server, and the acquiring the search result may include receiving, from the server, the search result acquired based on the search information.

According to an aspect of another exemplary embodiment, there is provided a non-transitory computer-readable storage medium storing a program comprising instructions to cause a computer to perform a method of searching in a terminal, the method comprising identifying whether search information is acquired from at least one among a first input interface acquiring first search information of a first data type and a second input interface acquiring second search information of a second data type, the first data type being different from the second data type. The method further includes acquiring a search result from data storage based on the search information, in response to the identifying that the search information is acquired from at least one among the first input interface and the second input interface, and providing the search result.

BRIEF DESCRIPTION OF THE DRAWINGS

The above and/or other aspects will be more apparent by describing exemplary embodiments with reference to the accompanying drawings, in which:

FIGS. 26, 27, 28, 29, and 30 are diagrams illustrating operations of a terminal searching with regard to a user's schedule, according to an exemplary embodiment;

DETAILED DESCRIPTION

Figure 1:
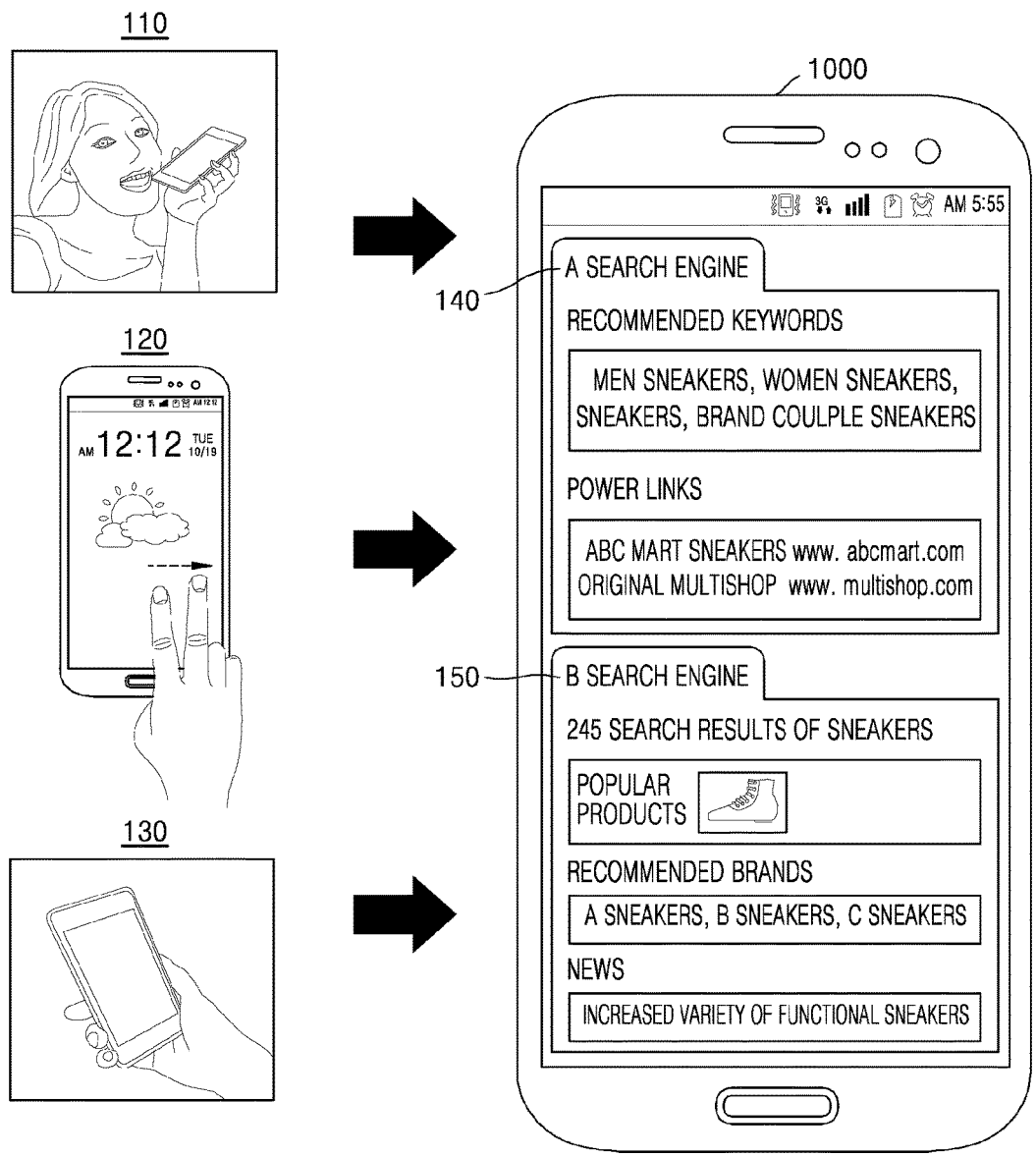
FIG. 1 is a conceptual diagram illustrating a terminal for searching according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIG. 1 is a conceptual diagram illustrating a terminal 1000 for searching according to an exemplary embodiment.

According to an exemplary embodiment, the terminal 1000 may receive search information via an input interface. The input interface of the terminal 1000 may be formed of a plurality of input interfaces. Each of the input interfaces may receive search information as a data type corresponding to each of the input interface.

According to an exemplary embodiment, referring to view 110 of FIG. 1, the terminal 1000 may receive an audio signal. The terminal 1000 may include an audio sensor to detect voice of a user. For example, the audio sensor may be formed as a microphone. The terminal 1000 may detect an audio signal of the user, analyze the audio signal, and extract search information that corresponds to the audio signal.

According to another exemplary embodiment, referring to view 120 of FIG. 1, the terminal 1000 may receive a signal from a touch input of the user. The terminal 1000 may include a touch sensor or a proximity sensor for detecting the touch input of the user. For example, the touch sensor may be a touch film, a touch sheet, or a touch pad. The terminal 1000 may receive a manipulation signal from the touch input of the user via various input tools. The terminal 1000 may receive the manipulation signal via a hand of the user, a physical tool, or a stylus pen.

The terminal 1000 may detect a touch input, analyze the touch input, and perform an operation that corresponds to the touch input. Also, the terminal 1000 may output search information that corresponds to a detected touch signal on a display.

According to another exemplary embodiment, referring to view 130 of FIG. 1, the terminal 1000 may receive a text signal. The terminal 1000 may provide a text input interface on a display. The user may input a keyword via the text input interface.

According to an exemplary embodiment, the terminal 1000 may acquire search information and search based on the acquired search information. The terminal 1000 may search by using information stored in the terminal 1000 or by using information stored outside the terminal 1000.

The terminal 1000 may search by using data storage. The terminal 1000 may search by using information stored in the terminal 1000 (e.g., documents, images, schedules of the user, or history of search results stored in the terminal 1000), an application installed in the terminal 1000, or a server that stores a search engine and data. In this case, the terminal 1000 may be controlled such that a plurality of search engines, a plurality of applications, and a plurality of servers are searched by using search information that is input only once.

The application installed in the terminal 1000 may be distributed via an application store or an application market.

The search engine is a software system configured to search for information on the World Wide Web and File Transfer Protocol (FTP) servers. The information may include web pages, images, videos, and other types of files.

The terminal 1000 may search by using a search engine and an application or search by using a server. The server implemented in hardware may be configured in the same method as a web server, a web application server, or a Wireless Application Protocol (WAP) Server. Alternatively, the server implemented in software may include a program module programmed by using languages such as C, C++, Java, PHP, .Net, Python, or Ruby.

Alternatively, the server may be implemented by using a server program in a hardware server, the server program being provided by various operating systems, for example, DOS, Windows, Linux, UNIX, or Macintosh. Representatively, Website or Internet Information Server (IIS) used in the Windows environment and Apache, Nginx, or Light HTTP used in the UNIX environment may be used.

According to an exemplary embodiment, the terminal 1000 may receive search results from the storage in the terminal 1000, the plurality of applications installed in the terminal 1000, the plurality of search engines, and the plurality of servers. The terminal 1000 may provide all or a portion of the received search results.

According to an exemplary embodiment, referring to FIG. 1, the user may set a keyword as "sneakers" and input an audio signal, a touch signal, and text. The terminal 1000 may receive a search result acquired by searching with the "sneakers" as the keyword. The terminal 1000 may receive search results from an "A search engine" 140 and a "B search engine" 150 and display the search results on a display. The terminal 1000 may simultaneously display search results acquired from different search engines on a single screen, as shown in FIG. 1, or display the search results on different screens.

Although FIG. 1 illustrates that the terminal 1000 is a mobile terminal, the terminal 1000 is not limited thereto. The mobile terminal may be, but is not limited to, a cellular phone, a smartphone, a laptop computer, a tablet personal computer (PC), an electronic book (e-book) terminal device, a digital broadcast terminal device, a personal digital assistant (PDA), a portable multimedia player (PMP), a navigation device, an MP3 player, or a digital camera.

Figure 2:
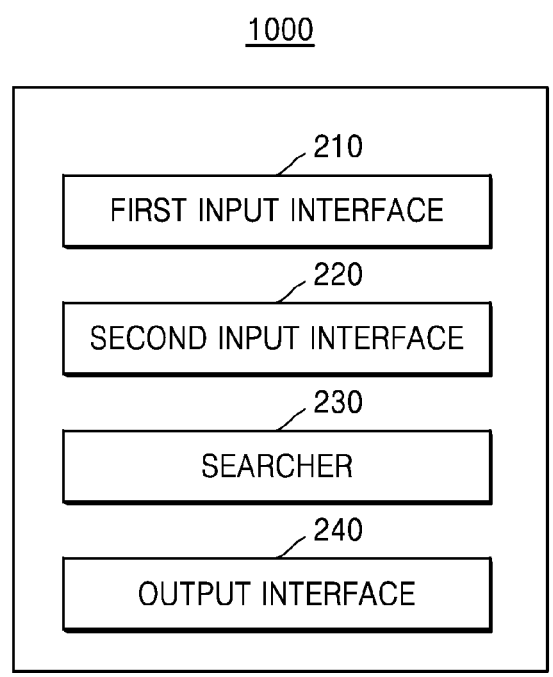
FIG. 2 is a block diagram illustrating a terminal for searching according to an exemplary embodiment.

FIG. 2 is a block diagram illustrating the terminal 1000 for searching according to an exemplary embodiment.

The terminal 1000 may include a first input interface 210, a second input interface 220, a searcher 230, and an output interface 240. However, the illustrated components are not all essential. The terminal 1000 may include more or less components than those shown. Hereinafter, the components will be described in detail.

The first input interface 210 may acquire first data type search information. The second input interface 220 may acquire second data type search information. The second data type is different from the first data type. Data types may include at least one selected from text data, audio data, video data, and still image data.

The searcher 230 may identify whether search information is acquired by the first input interface 210 and the second input interface 220. The searcher 230 acquires search start information from at least one input interface selected from the first input interface 210 and the second input interface 220. When the search start information is acquired, the searcher 230 acquires search information according to the search start information. The search information is acquired based on information that is input via at least one input interface selected from the first and second input interfaces 210 and 220. The information that is input via an input interface is configured as at least one selected from text data, audio data, video data, and still image data. For example, when audio data is input via a microphone, the searcher 230 may acquire the audio data, at it is, as search information, or analyze or process the audio data and acquire the analyzed or processed audio data as search information.

When the search start information instructs to acquire search information from the first input interface 210, the searcher 230 may acquire the search information from the first input interface 210. Alternatively, when the search start information instructs to acquire search information from the second input interface 220, the searcher 230 may acquire the search information from the second input interface 220.

The searcher 230 may acquire a search result found from data storage by using the acquired search information. The data storage may refer to data storage equipped in the terminal 1000 or data storage that is physically independent from the terminal 1000.

The search result is obtained based on at least one selected from information stored in the terminal 1000, information acquired from the plurality of applications, and information acquired from the plurality of search engines. The searcher 230 may provide the information stored in the terminal 1000, the information acquired from the plurality of applications, and the information acquired from the plurality of search engines, as they are, as the search result. Alternatively, the searcher 230 may classify or process the information according to a method predetermined by the user, and may provide the classified or processed information as the search result.

The data storage equipped in the terminal 1000 may include a hard disk drive (HDD), a read-only memory (ROM), a random access memory (RAM), a flash memory, and a memory card.

The data storage that is physically independent from the terminal 1000 includes a server. Also, a search engine and a server used by an application when searching are included in the data storage.

The server may be connected to numerous anonymous clients (including the terminal 1000) and/or other servers via a network. Accordingly, the server may refer to a computer system for receiving an operation execution request from a client or another server and deriving an operation result according to the operation execution request, or computer software (server program) installed for such a computer system.

Other than the server program described above, the server may be understood as a concept that includes a series of application programs being operated on the server, and, in some cases, various internal or external databases.

The searcher 230 may acquire the search result by using an application that corresponds to a data type of the search information. For example, when the data type of the search information is audio data, the searcher 230 may acquire the search result by using a search application that detects audio data. As another example, when the data type of the search information is text data, the searcher 230 may acquire the search result by using a search application that detects text data.

The searcher 230 may convert the search information to search information having a data type different from the data type of the search information. The searcher 230 may acquire the search result by using an application that corresponds to the converted data type of the search information. For example, when the data type of the search information is audio data, the searcher 230 may convert the audio data to text data, and transmit the search information to an application corresponding to the text data. The searcher 230 may convert the audio data to the text data by applying Speech-To-Text (STT) to the audio data.

The output interface 240 may provide the search result. The output interface 240 may receive search results from the plurality of search engines or plurality of applications, and provide the search results by using various arrangement methods. For example, the output interface 240 may provide the search result according to a search result history or criteria predetermined by the user.

The output interface 240 may provide the search result in various ways. For example, the output interface 240 may display the search result by using a display apparatus such as a liquid crystal display (LCD). In this case, the search result may be provided as, but is not limited to, at least one format selected from text, a still image, and a video. As another example, the output interface 240 may provide the search result by using audio.

The terminal 1000 may further include a communicator that receives the search result found by using the search information from the server.

The terminal 1000 may include a central processor unit (CPU) and control operations of the first input interface 210, the second input interface 220, the searcher 230, the output interface 240, and the communicator. The CPU may be implemented as an array of a plurality of logic gates or a combination of a general-use microprocessor and a memory device that stores programs executable in the microprocessor. The CPU may be implemented as other forms of hardware.

Hereinafter, various operations performed or applications executed by the terminal 1000 will be described. Even when a component is not specified from the first input interface 210, the second input interface 220, the searcher 230, the output interface 240, and the communicator, features that may be clearly understood by one of ordinary skill in the art may encompass exemplary embodiments. The scope of the exemplary embodiments is not limited by specific terms or physical/logical structures.

Figure 3:
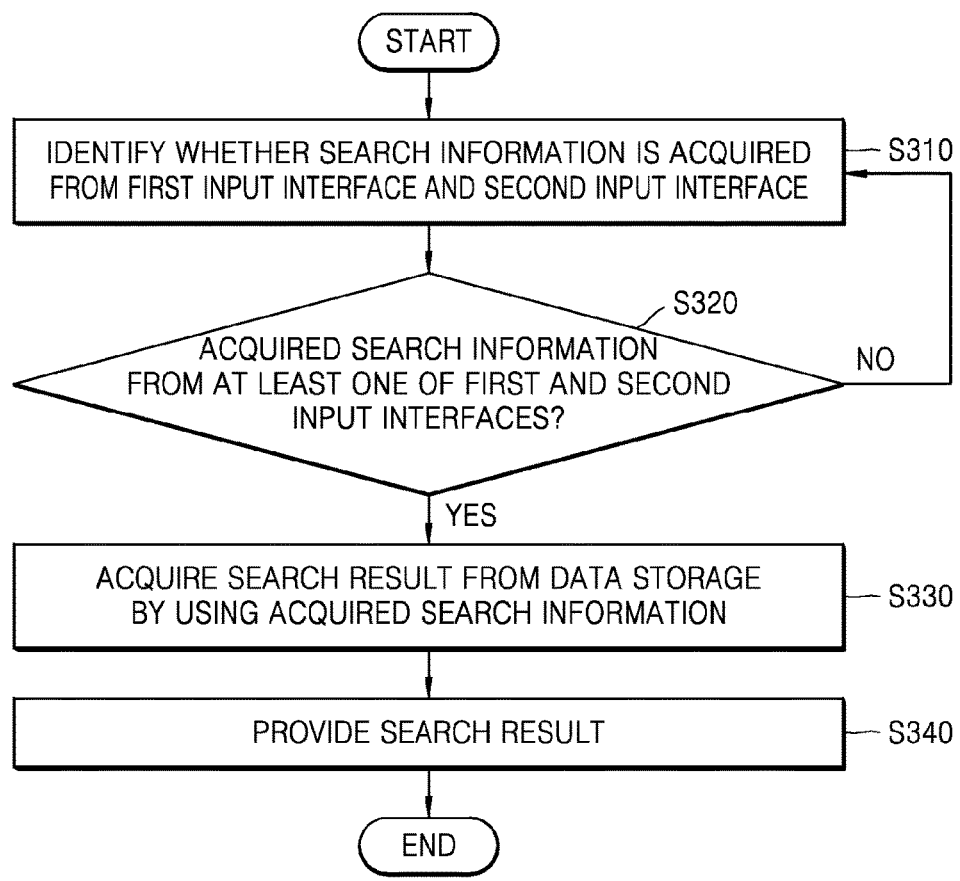
FIG. 3 is a flowchart illustrating a search method of a terminal, according to an exemplary embodiment.

FIG. 3 is a flowchart illustrating a search method of the terminal 1000, according to an exemplary embodiment.

Referring to FIG. 3, in operation S310, the terminal 1000 identifies whether search information is acquired from a first input interface and a second input interface.

In operation S320, the terminal 1000 identifies whether the search information is acquired from at least one selected from the first input interface and the second input interface. When the search information is acquired from the first input interface and/or the second input interface, the terminal 1000 executes operation S330. When the search information is not acquired from the first input interface or the second input interface, the terminal 1000 executes operation S310. When search start information instructs to acquire search information from the first input interface, the terminal 1000 acquires the search information from the first input interface. Alternatively, when the search start information instructs to acquire search information from the second input interface, the terminal 1000 acquires the search information from the second input interface.

Data types of the search information may include, but is not limited to, at least one selected from text data, audio data, video data, and still image data.

In operation S330, the terminal 1000 acquires a search result found from data storage by using the acquired search information.

The terminal 1000 may acquire the search result by using an application corresponding to a data type of the search information.

The terminal 1000 may convert the search information to search information having a data type different from the data type of the search information. The terminal 1000 may acquire the search result by using an application that corresponds to the converted data type of the search information.

Also, the terminal 1000 may determine at least one application by using at least one selected from a category of the search information and user information of the terminal 1000, and may search by using the determined at least one application. The user information may include, but is not limited to, at least one selected from location information of the terminal 1000, search time information, and application usage frequency information.

The terminal 1000 may determine data to be used for searching from data in the data storage based on a mode of the terminal 1000, and may acquire a search result from the determined data. The mode of the terminal 1000 may include, but is not limited to, at least one selected from a user mode, a guest mode, a terminal lock mode, and a network use mode. When the mode of the terminal 1000 is the guest mode, the terminal 1000 may search public information and not search personal user information of the terminal 1000.

In operation S340, the terminal 1000 provides a search result. The terminal 1000 provides search results from the plurality of applications. For example, the terminal 1000 may provide the search result by using the application corresponding to the data type of the search information and the search result acquired by the application corresponding to the converted data type of the search information.

The terminal 1000 may provide the search result based on information acquired from the plurality of applications, the plurality of search engines, and a memory device in the terminal 1000. The terminal 1000 may provide the search result by using at least one selected from search result history user information, search result information of a user other than the user of the terminal 1000, previously-used application information, user preference information of the terminal 1000, and user schedule information of the terminal 1000.

Figure 4:
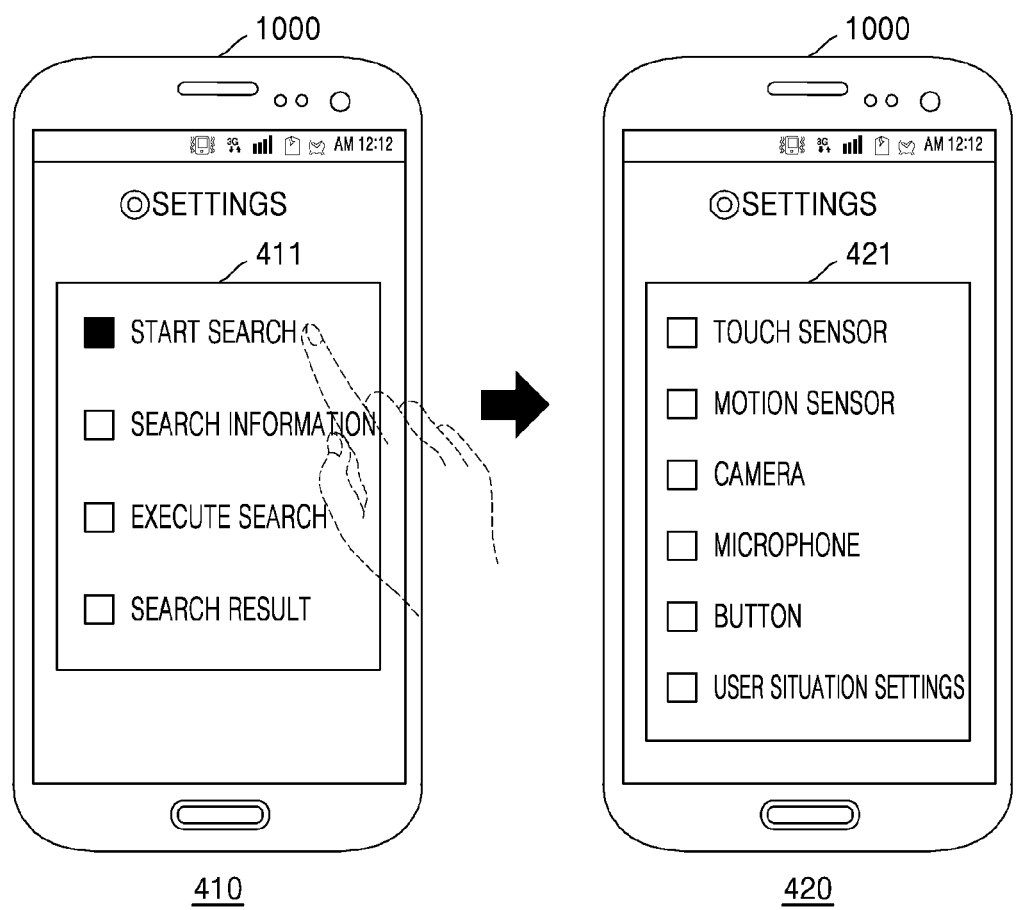
FIG. 4 is a diagram illustrating a method of editing settings in a terminal, according to an exemplary embodiment.

FIG. 4 is a diagram illustrating a method of editing settings in the terminal 1000, according to an exemplary embodiment.

Referring to view 410 of FIG. 4, the terminal 1000 provides a settings screen. The user may use the settings screen to set search operations of the terminal 1000. A settings menu 411 of the search operations of the terminal 1000 may include, but is not limited to, a "start search" option, a "search information" option, an "execute search" option, and a "search result" option. The "start search" is an operation performed before the user inputs the search information via the terminal 1000 and refers to a state in which the terminal 1000 may receive the search information. By setting the "start search" option, the terminal 1000 is set to a state capable of receiving the search information.

Referring to view 420 of FIG. 2, a submenu 421 of the "start search" option may include a "touch sensor" option, a "motion sensor" option, a "camera" option, a "microphone" option, a "button" option, and a "user situation settings" option. The user may set the terminal 1000 to start searching by selecting at least one option from the submenu 421.

The user may set the terminal 1000 to start searching by selecting at least one from the "touch sensor" option, the "motion sensor" option, the "camera" option, the "microphone" option, the "button" option, and the "user situation settings." When the "touch sensor" option is selected, the touch sensor may detect a touch signal of the user, and the terminal 1000 may be converted from a sleep mode to a search execution state. When the "motion sensor" option is selected, the motion sensor may detect a motion signal of the user, and the terminal 1000 may be converted from the sleep mode to the search execution state.

Furthermore, the terminal 1000 may be converted from the sleep mode to the search execution state when the "camera" option is selected and the camera operates, when the "microphone" option is selected and the microphone operates, or when the "button" option is selected and the button is pressed.

Also, when the user randomly sets a situation and the situation occurs, the terminal 1000 may be converted from the sleep mode to the search execution state.

Figure 5:
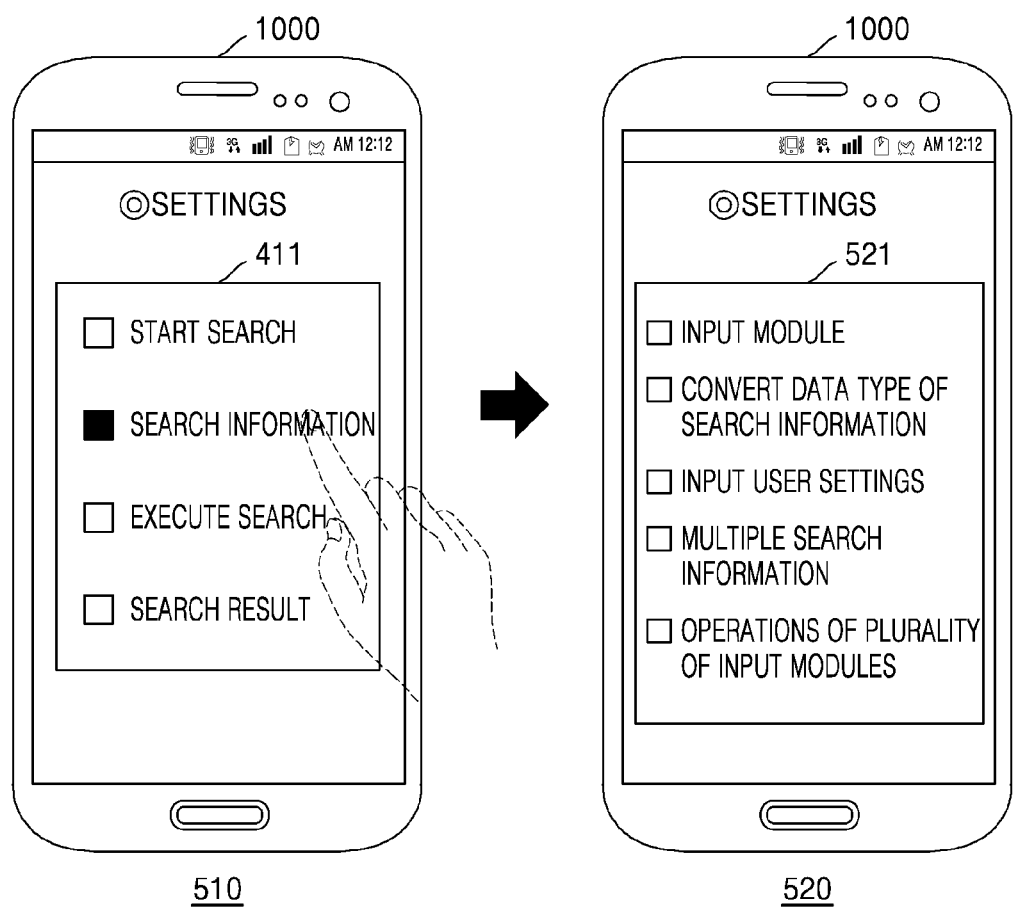
FIG. 5 is a diagram illustrating a method of editing settings in a terminal, according to another exemplary embodiment.

FIG. 5 is a diagram illustrating a method of editing settings in the terminal 1000, according to another exemplary embodiment.

Referring to view 510 of FIG. 5, the terminal 1000 provides a settings screen. The user may use the settings screen to set search operations of the terminal 1000. The settings menu 411 of the search operations of the terminal 1000 may include the "start search" option, the "search information" option, the "execute search" option, and the "search result" option. The search information is information input by the user to search. The user may input a keyword or a search command via an input interface of the terminal 1000.

Referring to view 520 of FIG. 5, a submenu 521 of the "search information" option may include, but is not limited to, an "input module" option, a "convert data type of search information" option, a "input user settings" option, a "multiple search information" option, and an "operations of plurality of input modules" option. The user may select at least one option from the submenu 521 and set the "search information" option.

The "input module" option is related to setting an input module of the terminal 1000 that receives search information. The input module may include a keypad, a camera, a microphone, and a touch pad. The user may use the keypad to input text. The user may use the camera to scan at least one selected from text, images, and codes (for example, a QR code). The user may record at least one selected from audio and a sound source by using the microphone. The user may input a touch signal by using the touch pad.

The "convert data type of search information" option is related to setting the terminal 1000 such that a data type of input search information is converted to another data type. The terminal 1000 may receive first data type search information and convert the first data type search information to second data type search information. As an example of data type conversion, the terminal 1000 may convert audio data, which is received as search information, to text data. Alternatively, the terminal 1000 may convert text data that is received as search information to audio data. The data types of the search information include at least one selected from text data, audio data, video data, and still image data.

The "input user settings" option is related to setting the terminal 1000 such that the search information is received according to a method predetermined by the user. The user may predetermine an input that corresponds to a command or a keyword so that the terminal 1000 executes the command or searches corresponding to the keyword. For example, when the user inputs a predetermined pattern into an input interface, the terminal 1000 may execute a command (or a search operation) that corresponds to the predetermined pattern.

The "multiple search information" option relates to setting the terminal 1000 such that a plurality of pieces of search information are processed when the plurality of pieces of search information are input. For example, the user may set either to sequentially or non-sequentially search when a plurality of pieces of search information are input. For example, the user may set the terminal 1000 to simultaneously search the plurality of pieces of search information. The user may input the plurality of pieces of search information via a single input module or a plurality of input modules. The terminal 1000 may simultaneously search each piece of search information.

The "operations of plurality of input modules" option relates to setting a method of processing, when search information is input via a plurality of input modules, search information that is input to an input module among the plurality of input modules. For example, among first search information input via a first input module and second search information input via a second input module, the user may set the terminal 1000 to first search the first search information input via the first input module.

Figure 6:
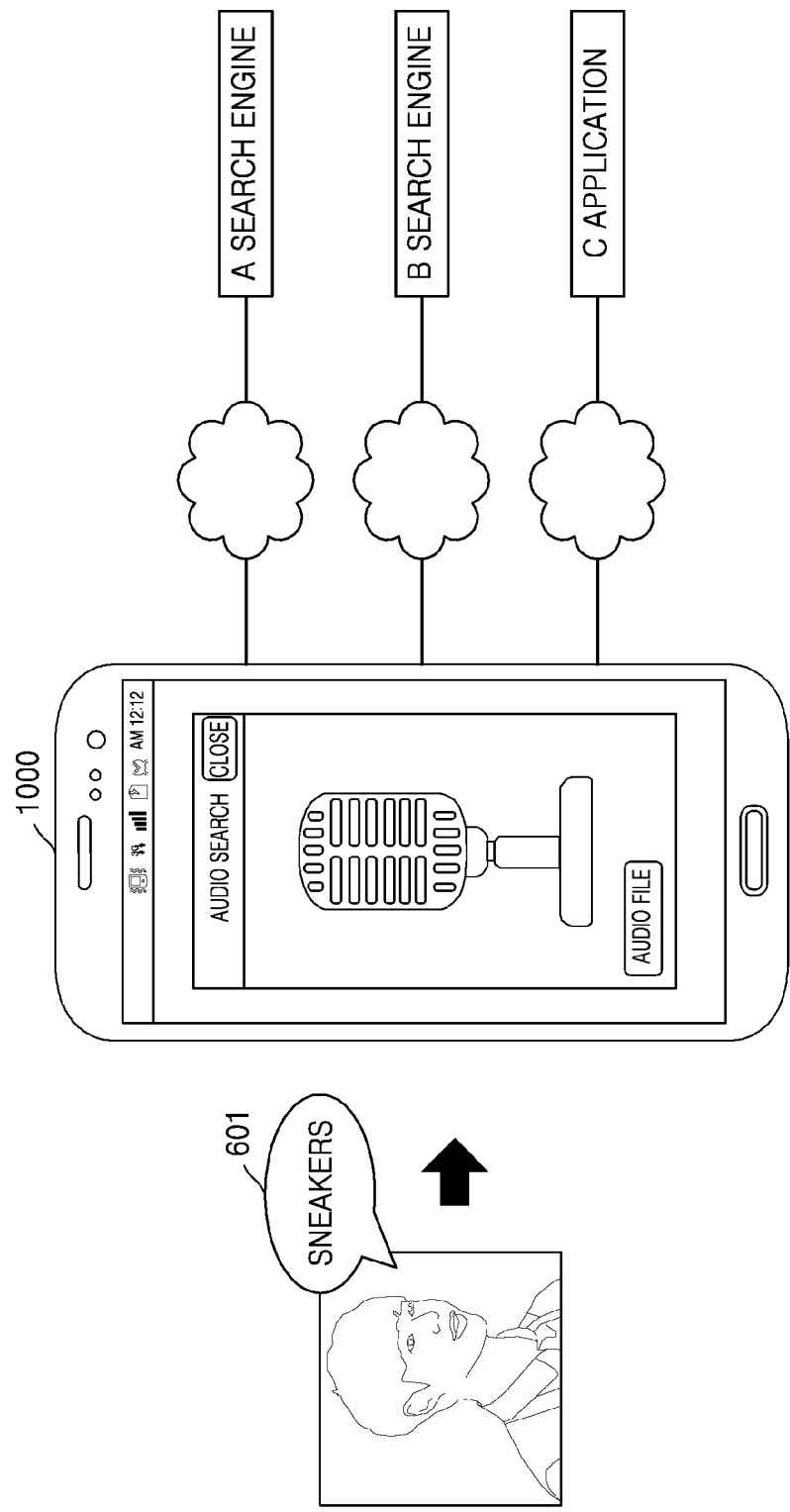
FIG. 6 is a diagram illustrating a terminal searching by acquiring audio data type search information, according to an exemplary embodiment.

FIG. 6 is a diagram illustrating the terminal 1000 searching by acquiring audio data type search information, according to an exemplary embodiment.

The user may use audio to input a keyword. The terminal 1000 may detect a voice of the user and acquire search information. Based on audio data, the terminal 1000 may search by using an application or a search engine that corresponds to the audio data. For example, the user may say a keyword "sneakers" 601 via a microphone of the terminal 1000. The terminal 1000 may acquire search information "sneakers" 601 and search. In this case, the terminal 1000 may search by using an "A search engine," a "B search engine," and a "C application" that search by using audio data.

Figure 7:
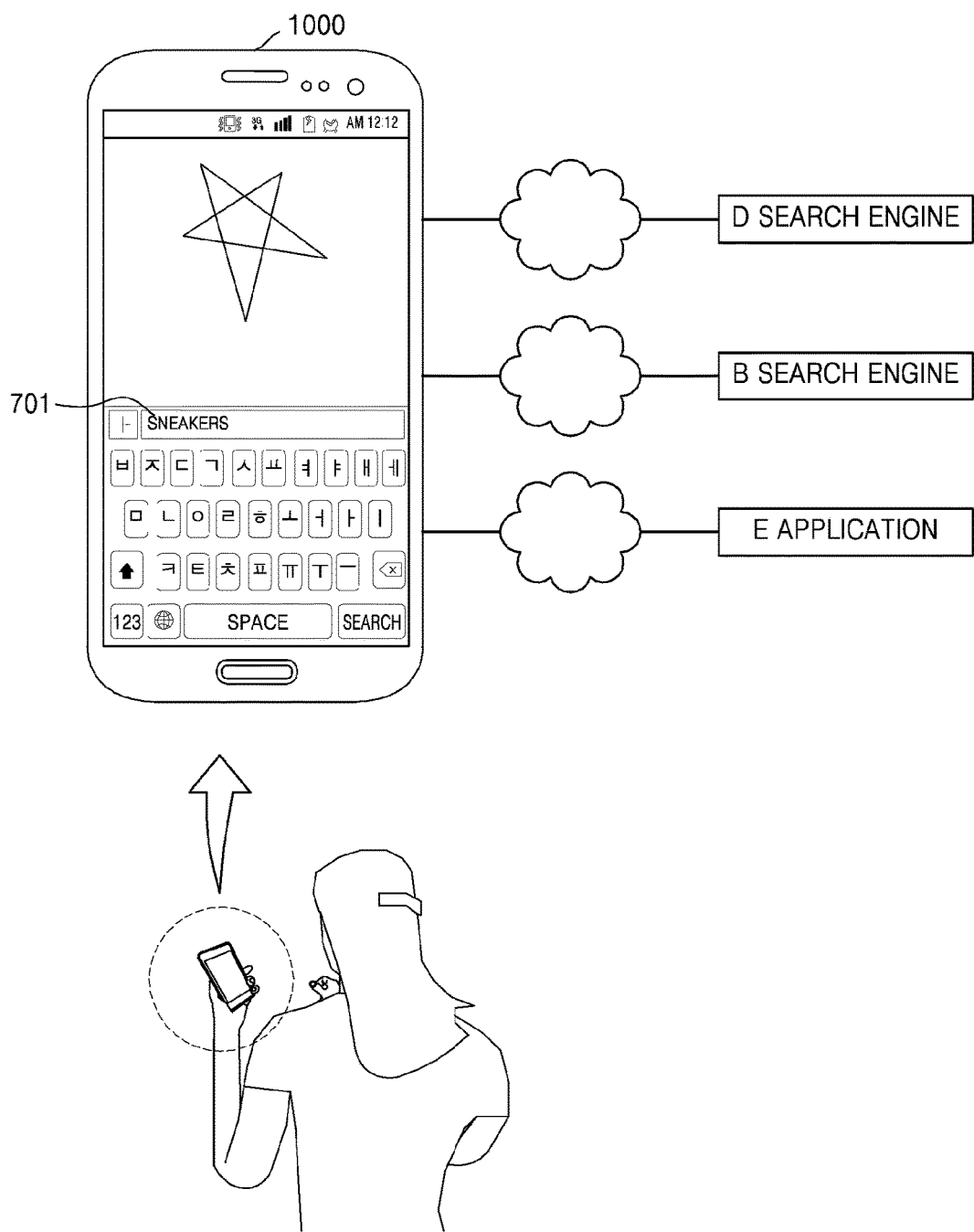
FIG. 7 is a diagram illustrating a terminal searching by acquiring text data type search information, according to an exemplary embodiment.

FIG. 7 is a diagram illustrating the terminal 1000 searching by acquiring text data type search information, according to an exemplary embodiment.

The user may input a keyword in text. The terminal 1000 may acquire search information based on the text input by the user. Based on the text, the terminal 1000 may search by using an application or a search engine that corresponds to the text data. For example, the user may input a keyword "sneakers" 701 in text via a text input interface of the terminal 1000. The terminal 1000 may acquire search information "sneakers" 701 and search. In this case, the terminal 1000 may search by using a "D search engine," a "B search engine," and an "E application" that search by using text data.

Figure 8:
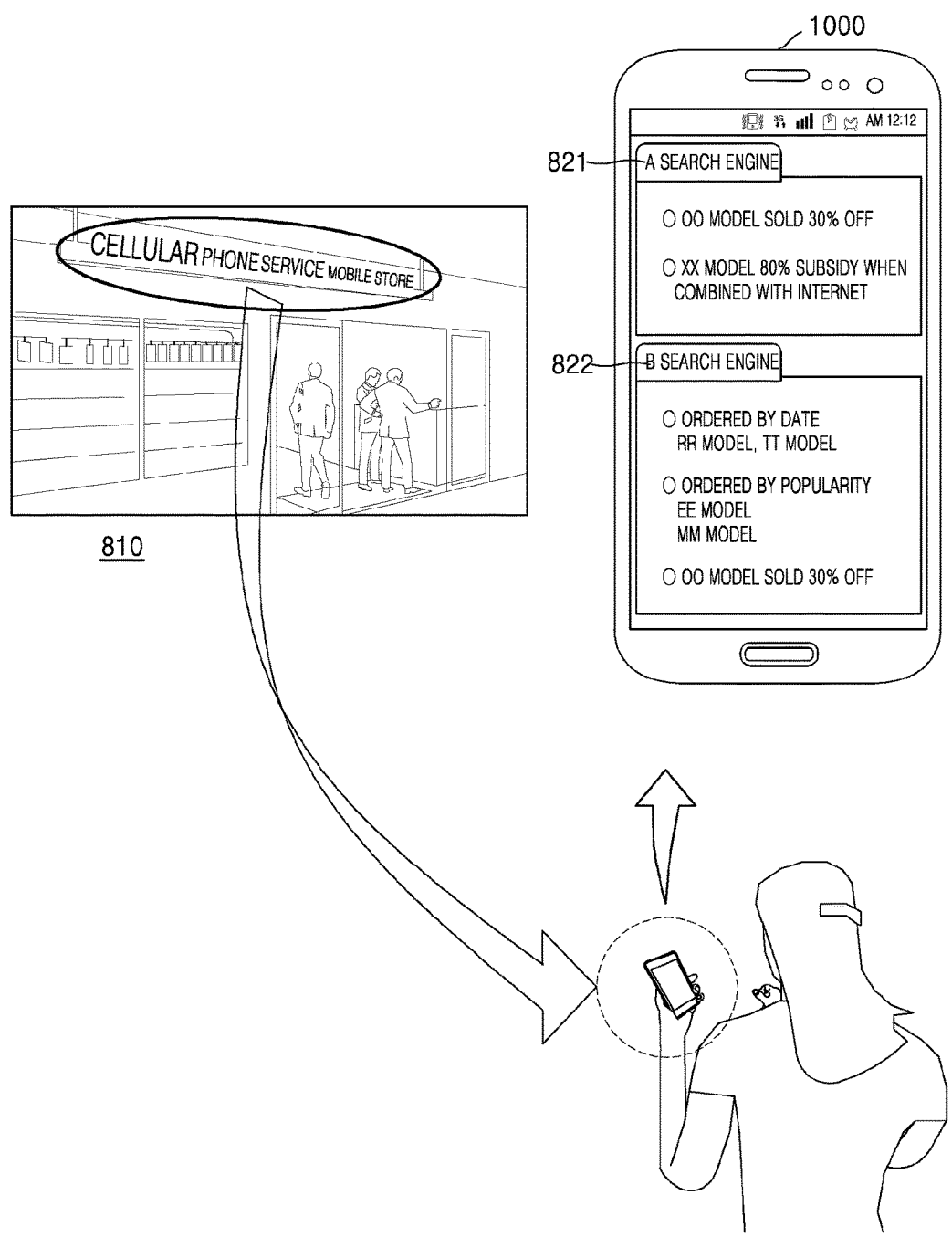
FIG. 8 is a diagram illustrating a terminal searching by detecting location information, according to an exemplary embodiment.

FIG. 8 is a diagram illustrating the terminal 1000 searching by detecting location information, according to an exemplary embodiment.

The terminal 1000 may determine a search application or a search engine according to a situation of the user, and then search. For example, the terminal 1000 may detect location user information, and determine an application to search based on the location information.

In detail, the user may visit a cellular phone shop to buy a cellular phone (view 810 of FIG. 8). The user may try to search for information about the cellular phone. In this case, the user may input a keyword related to the cellular phone to the terminal 1000. The terminal 1000 may determine a location of the cellular phone shop identified by the terminal 1000 as the location user information. The terminal 1000 may determine at least one application for searching based on the location information and the keyword that is input by the user. The determined at least one application may be an application specialized for searching information about electronic goods. The terminal 1000 may more efficiently search by using an application specialized for searching electronic goods than by using a used application.

The terminal 1000 may search by using the at least one application and provide a search result. The search result may be provided according to each application or results found in the applications may be combined and provided. For example, the terminal 1000 may provide a search result obtained from an "A search engine" 821 and a search result obtained from a "B search engine" 822 on a single screen.

Figure 9:
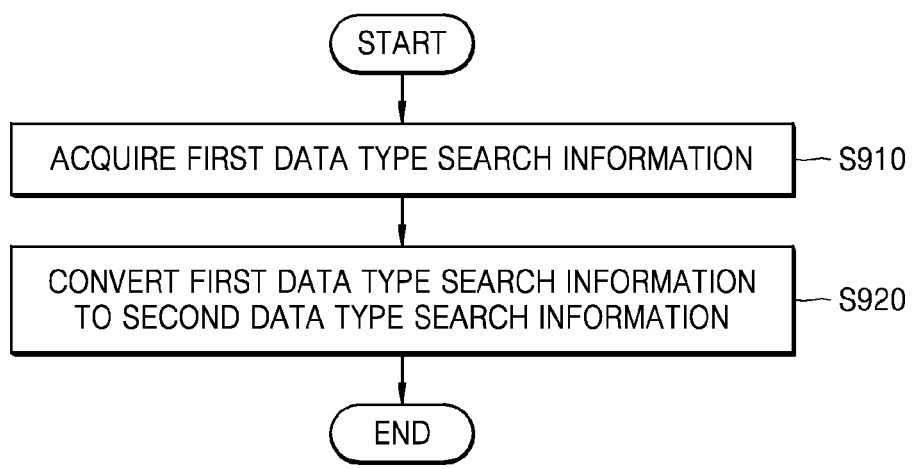
FIG. 9 is a flowchart illustrating processes of data type conversion, according to an exemplary embodiment.

FIG. 9 is a flowchart illustrating processes of data type conversion, according to an exemplary embodiment.

As shown in FIG. 9, in operation S910, the terminal 1000 may acquire first data type search information. The terminal 1000 may acquire search start information from the first input interface. When the search start information is acquired, the terminal 1000 may acquire search information from the first input interface according to the search start information.

In operation S920, the terminal 1000 may convert the first data type search information to second data type search information. For example, the terminal 1000 may convert at least one selected from audio data, video data, and still image data to text data. The terminal 1000 may search by using the text data.

Figure 10:
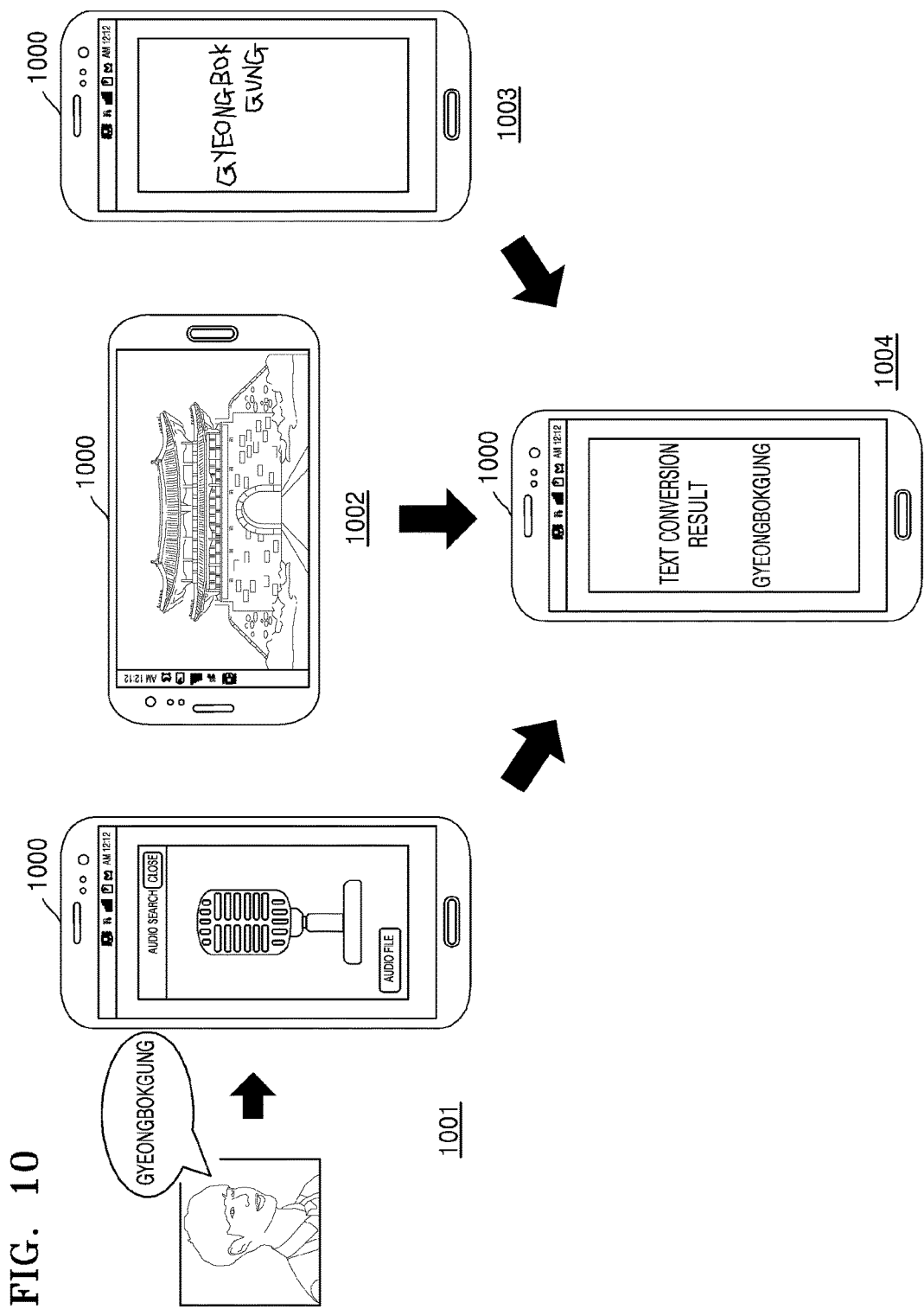
FIG. 10 is a diagram illustrating processes of data type conversion, according to an exemplary embodiment.

FIG. 10 is a diagram illustrating processes of data type conversion, according to an exemplary embodiment.

As shown in FIG. 10, the user may input search information by using various methods. Referring to view 1001 of FIG. 10, the user may say "Gyeongbokgung." The terminal 1000 may acquire audio data type search information "Gyeongbokgung," via the microphone. Referring to view 1002 of FIG. 10, the user may capture an image or record a video of "Gyeongbokgung." The terminal 1000 may acquire image data type search information "Gyeongbokgung" by using at least one selected from information stored in the terminal 1000, a search engine, and an application. Alternatively, referring to view 1003 of FIG. 10, the user may write "Gyeongbokgung" by using a touch pen or the like on a touch pad. The terminal 1000 may acquire image data type search information "Gyeongbokgung" by using a touch sensor.

Referring to view 1004 of FIG. 10, the terminal 1000 may convert the search information to search information having a data type different from the data type of the search information. The terminal 1000 may convert first data type search information to second data type search information. The terminal 1000 may convert audio data type search information to text data type search information. Alternatively, the terminal 1000 may convert image data type search information to text data type search information. Data types include, but are not limited to, text data, audio data, video data, and still image data.

For example, the terminal 1000 may convert the audio data type search information "Gyeongbokgung" and the image data type search information "Gyeongbokgung" to text data type search information "Gyeongbokgung." The terminal 1000 may search by using the text data type search information "Gyeongbokgung."

Figure 11:
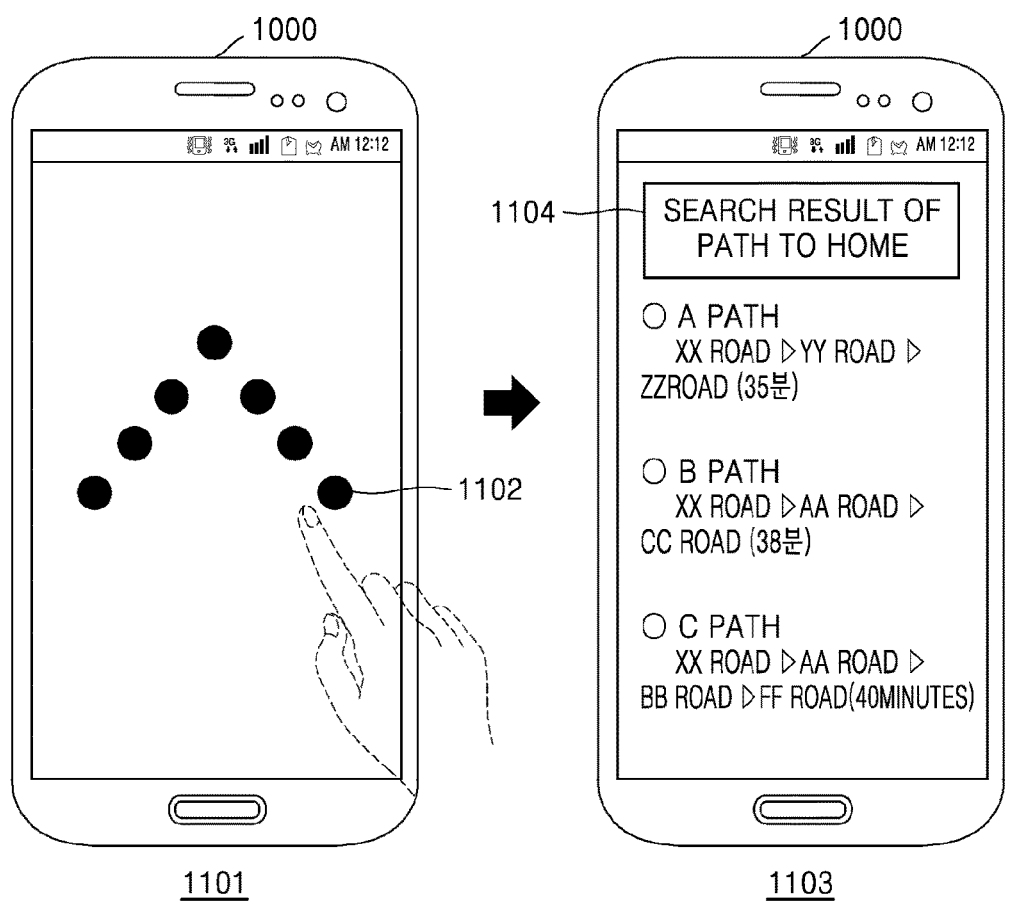
FIG. 11 is a diagram illustrating a terminal searching according to a command, according to an exemplary embodiment.

FIG. 11 is a diagram illustrating the terminal 1000 searching according to a command, according to an exemplary embodiment.

The user may set the terminal 1000 to execute a command by only conducting an action (e.g., drawing a pattern, inputting a password, performing motions, or recognizing a fingerprint). For example, the user may set a command for "searching for a path from a current location to home" by using a pattern signal 1102. When the user inputs the mountain pattern signal 1102 by using a touch pen or a finger to an input interface of the terminal 1000, the terminal 1000 may be set to perform an operation of "searching for a path from a current location to home."

Referring to view 1101 of FIG. 11, the user may input the mountain pattern signal 1102 by using a finger to touch a touch input interface of the terminal 1000. Referring to view 1103 of the FIG. 11, the terminal 1000 may detect the mountain pattern signal 1102 and display a search result 1104 of the path from the current location to home. In this case, the terminal 1000 may provide the search result 1104 by using at least one selected from a search engine, an application, or a search history stored in the terminal 1000. The terminal 1000 may provide respective search results of the search engine, the application, and the search history stored in the terminal 1000 on different screens, or may combine and provide the respective search results on a single screen.

Figure 12:
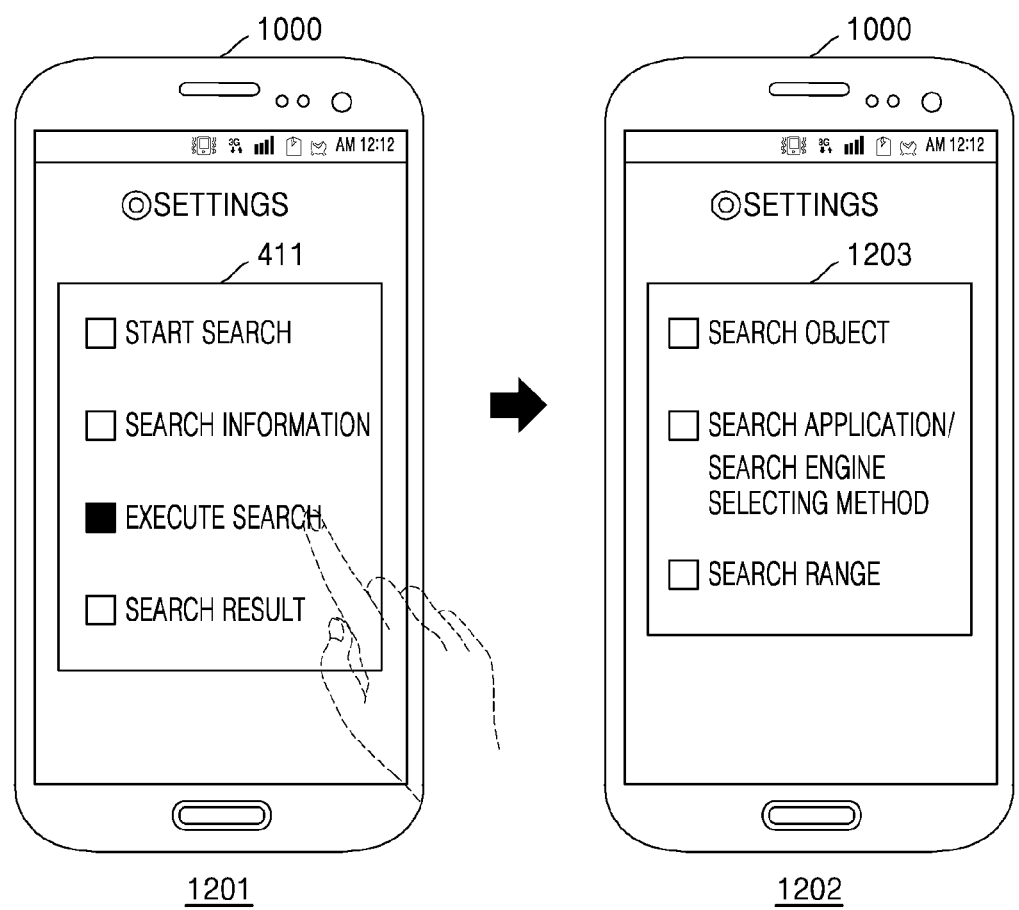
FIG. 12 is a diagram illustrating a method of editing settings in a terminal, according to another exemplary embodiment.

FIG. 12 is a diagram illustrating a method of editing settings in the terminal 1000, according to another exemplary embodiment.

Referring to view 1201 of FIG. 12, the terminal 1000 provides a settings screen. The user may use the settings screen to set search operations of the terminal 1000. The settings menu 411 of the search operations of the terminal 1000 may include the "start search" option, the "search information" option, the "execute search" option, and the "search result" option. The "execute search" option is for setting details used when terminal 1000 searches by using the acquired search information.

Referring to view 1202 of FIG. 12, a submenu 1203 of the "execute search" option may include, but is not limited to, a "search object" option, a "search application/search engine selecting method" option, and a "search range" option. The user may set the "execute search" option by selecting at least one option from the submenu 1203.

The "search object" option is related to setting where to search or use what to search. The search object may include information in the terminal 1000, an application installed in the terminal 1000, a search engine installed in the terminal 1000, and an external storage device.

The "search application/search engine selecting method" option is related to setting a method of selecting a search application or a search engine for searching. The "search application/search engine selecting method" option may include, but is not limited to, a method of setting an application or a search engine appropriate for a data type of search information, a method of converting a data type of search information and setting an application or a search engine appropriate for the converted data type, a method of setting an application or a search engine related to search information, a method of setting an application or a search engine based on a situation of the user (e.g., a location of the user, or a search time used by the user), a method of setting an application or a search engine according to usage frequency of the user, and a method of setting an application or a search engine based on a search history of another user.

The "search range" option is related to setting a search range when searching. The "search range" option may include, but is not limited to, personal information, whether or not to search, a network usage range, a search exclusion range, and a search range according to a mode of the terminal 1000.

Figure 13:
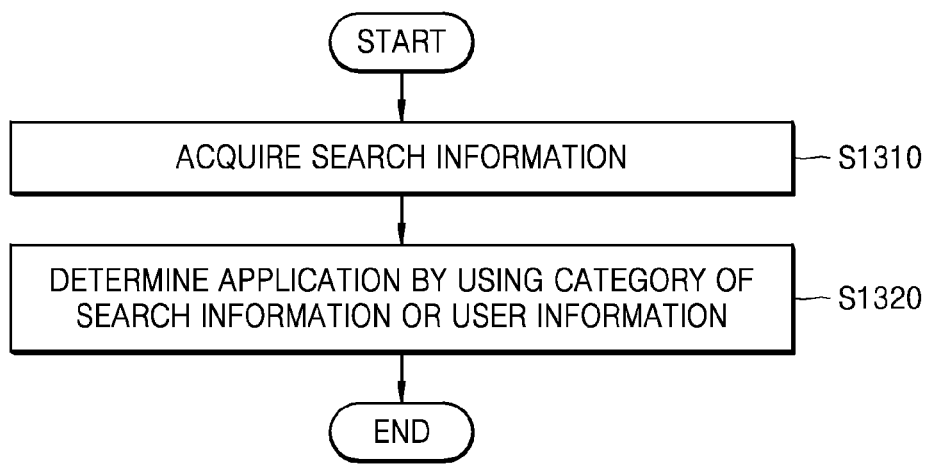
FIG. 13 is a flowchart illustrating a method of searching by using an application, according to an exemplary embodiment.

FIG. 13 is a flowchart illustrating a method of searching by using an application, according to an exemplary embodiment.

As shown in FIG. 13, in operation S1310, the terminal 1000 acquires search start information from at least one input interface from a plurality of input interfaces, and may acquire search information according to the acquired search start information.

In operation S1320, the terminal 1000 may determine an application by using a category of the search information or user information. The terminal 1000 may search by using the determined application and the search information. The terminal 1000 may provide a search result obtained from the application.

For example, when the acquired search information indicates "clothes," the terminal 1000 may determine an application for searching "clothes" in detail, and search for "clothes" by using the determined application. Alternatively, when the search information indicates "restaurants," the terminal 1000 may determine an application or a search engine for recommending "restaurants," and search for "restaurants" by using the determined application. In this case, the terminal 1000 may acquire search results from a plurality of applications. The terminal 1000 may provide the search results provided by the plurality of applications such that each search result is distinguishable, or combine and provide the search results.

As another example, the terminal 1000 may determine an application based on a usage frequency of an application used by the user. The user may use a map application to search for directions or locations. When there is a record indicating that the user has used an "A" map application 10 times and a "B" map application 3 times, the terminal 1000 may determine the "A" map application has an application to search first. Also, when the terminal 1000 displays search results by using the "A" map application and the "B" map application, a search result obtained by the "A" map application may be displayed first on the terminal 1000.

Figure 14:
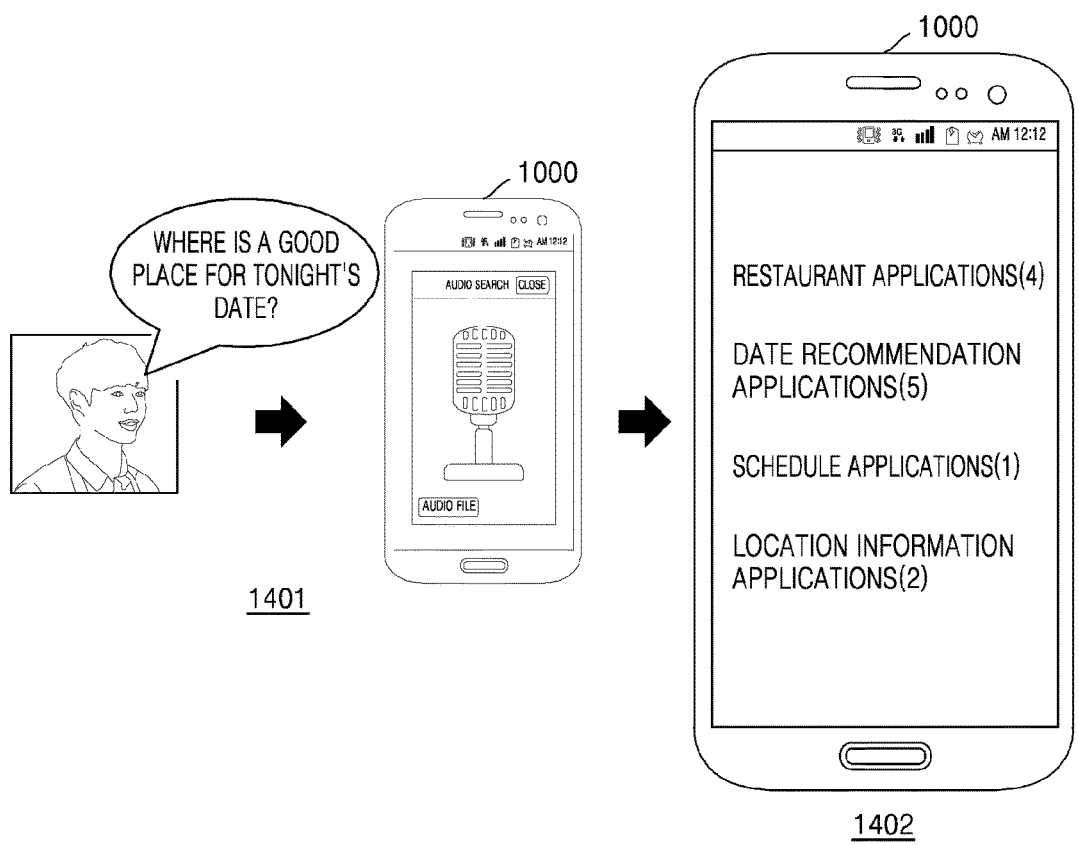
FIGS. 14 and 15 are diagrams illustrating a method of searching by using an application, according to an exemplary embodiment.
Figure 15:
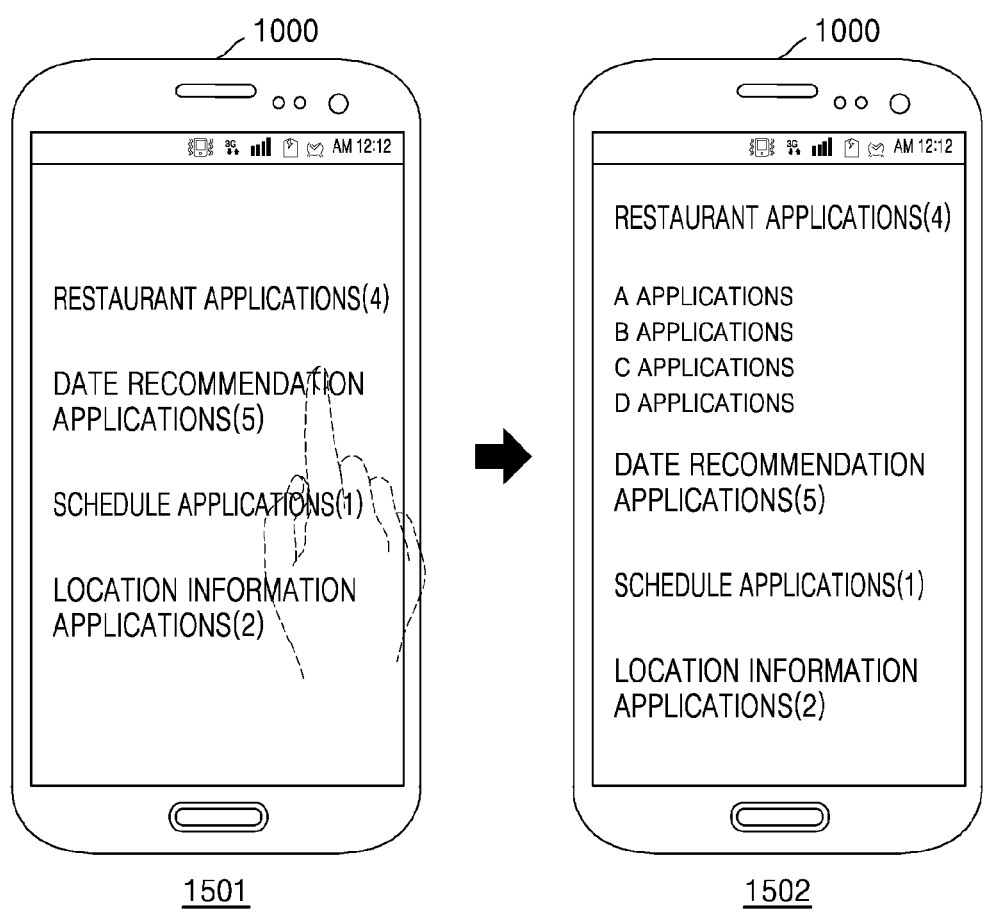

FIGS. 14 and 15 are diagrams illustrating a method of searching by using an application, according to an exemplary embodiment.

The user may input search information via any one input interface selected from a plurality of input interfaces of the terminal 1000. Referring to view 1401 of FIG. 14, the user uses audio to input search information, and the terminal 1000 may acquire audio data of the user via a microphone. When the user says "where is a good place for tonight's date," the terminal 1000 acquires audio data via the microphone. In this case, the terminal 1000 may extract words such as "tonight," "date," and "where" based on the audio data and acquire search information "recommend date place for tonight." Alternatively, the terminal 1000 may convert audio data "recommend date place for tonight" to text data and acquire the search information. The terminal 1000 may extract words such as "tonight," "date," and "where" based on the text data and acquire the search information "recommend date place for tonight."

Referring to view 1402 of FIG. 14, the terminal 1000 may determine an application or a search engine by using at least one selected from a category of the search information and user information. For example, because the search information acquired by the terminal 1000 is "recommend date place for tonight," a restaurant review application may be used to search for a good restaurant for tonight's dinner. Alternatively, the terminal 1000 may search by using a date recommendation application to recommend a date course for tonight's dinner. The terminal 1000 may search by using a schedule application to identify whether a user schedule overlaps tonight's date. The terminal 1000 may search by using a location information application to provide a date place based on a location of the user. Applications that may be used to search for "recommend date place for tonight" are not limited to those described above.

Referring to view 1501 of FIG. 15, the terminal 1000 may search by using a restaurant application, a date recommendation application, a schedule application, and a location information application. As shown in view 1501 of FIG. 15, the terminal 1000 may search by using 4 restaurant applications, 5 date recommendation applications, 1 schedule application, and 2 location information applications.

The terminal 1000 may search by using all applications provided in each category, or may search by using an application selected by the user. For example, referring to view 1502 of FIG. 15, the terminal 1000 may search by receiving an input of selecting at least one from the 4 restaurant applications.

Figure 16:
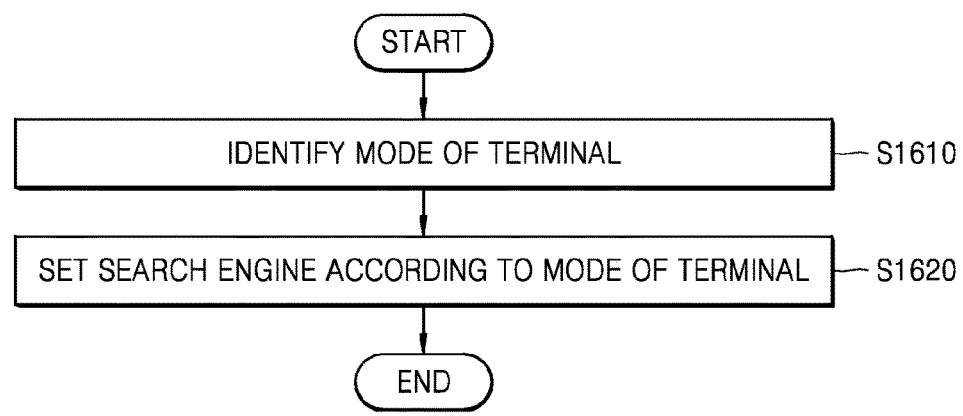
FIG. 16 is a flowchart of a method of searching according to a mode of a terminal, according to an exemplary embodiment.

FIG. 16 is a flowchart of a method of searching according to a mode of the terminal 1000, according to an exemplary embodiment.

As shown in FIG. 16, in operation S1610, the terminal 1000 identifies a mode of the terminal 1000. The mode of the terminal 1000 may include, but is not limited to, at least one selected from a user mode, a guest mode, a terminal lock mode, and a network use mode. The user mode indicates that the user searches the terminal 1000 by oneself. The guest mode indicates that another user searches the terminal 1000. The terminal lock mode indicates searching the terminal 1000 in a locked state. The network use mode indicates searching according to a network set by the user.

In operation 1620, the terminal 1000 sets a search engine according to the mode of the terminal 1000. In the user mode, the terminal 1000 may set a search engine without a limitation of a search range or a search object. In the guest mode, the terminal 1000 may set a search engine within a limited range, unlike when the user searches. For example, the terminal 1000 may set search engines such that charged search engines are excluded and only free search engines searched. In the terminal lock mode, since the terminal 1000 may not be able to provide all search results in a locked state, the terminal 1000 may set a search engine within a search engine range that is preset by the user. In the network use mode, the terminal 1000 may set a search engine that may search by using not only information in the terminal 1000 but also a network.

Figure 17:
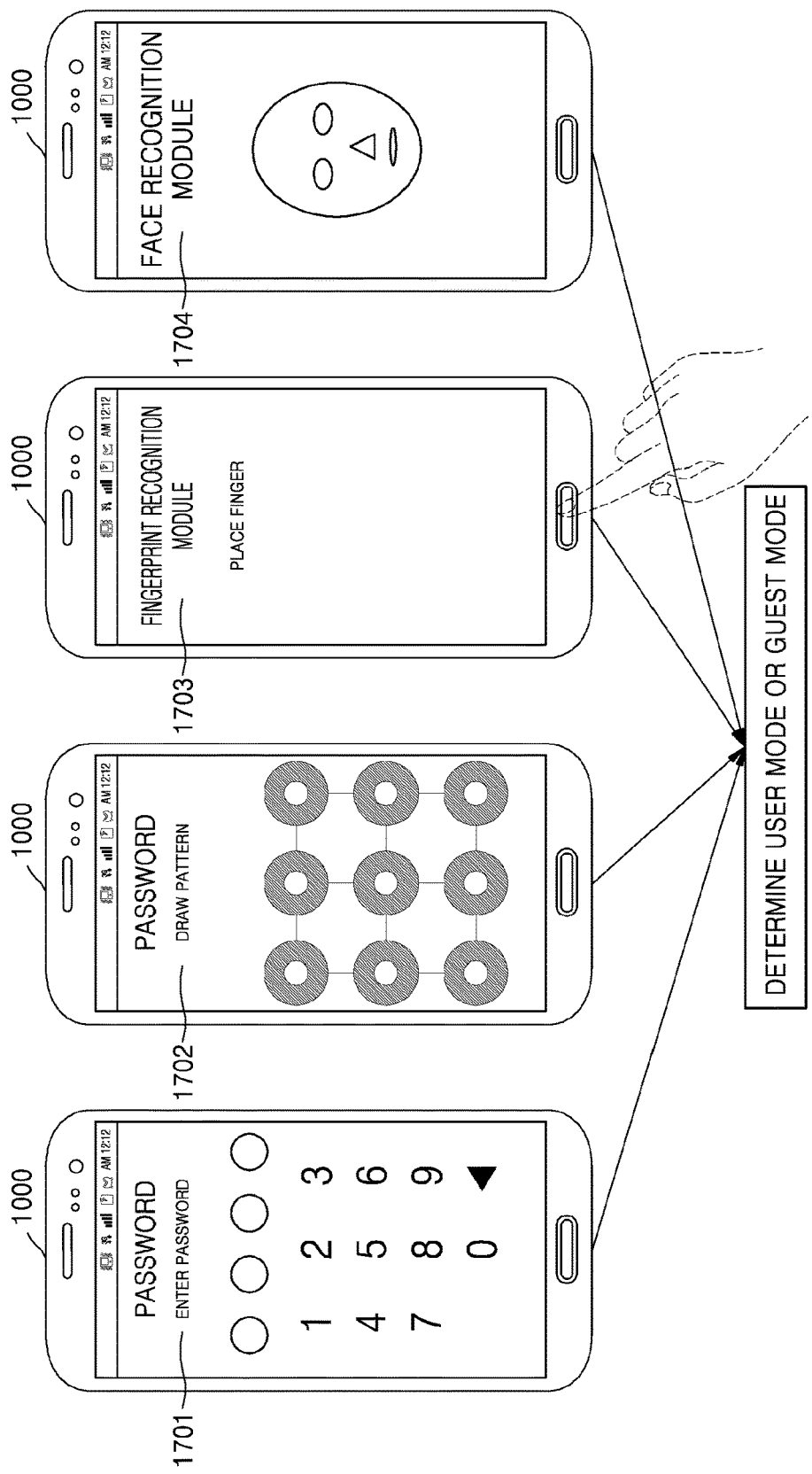
FIG. 17 is a diagram illustrating determining of a mode of a terminal according to user verification, according to an exemplary embodiment.

FIG. 17 is a diagram illustrating determining of a mode of the terminal 1000 according to user verification, according to an exemplary embodiment.

The terminal 1000 may determine a mode of the terminal 1000 according to whether the user is verified or not. User verification methods may include, but are not limited to, a method 1701 of receiving identification in the form of numbers, a method 1702 of receiving identification in the form of patterns, a fingerprint recognition method 1703, and a face recognition method 1704. According to the fingerprint recognition method 1703, user verification may be performed when the user puts a finger on a location of the terminal 1000 for recognizing a fingerprint. According to the face recognition method 1704, user verification may be performed when the user locates the face on a screen provided on the terminal 1000. According to a user verification result, the terminal 1000 may determine between the user mode and the guest mode.

Figure 18:
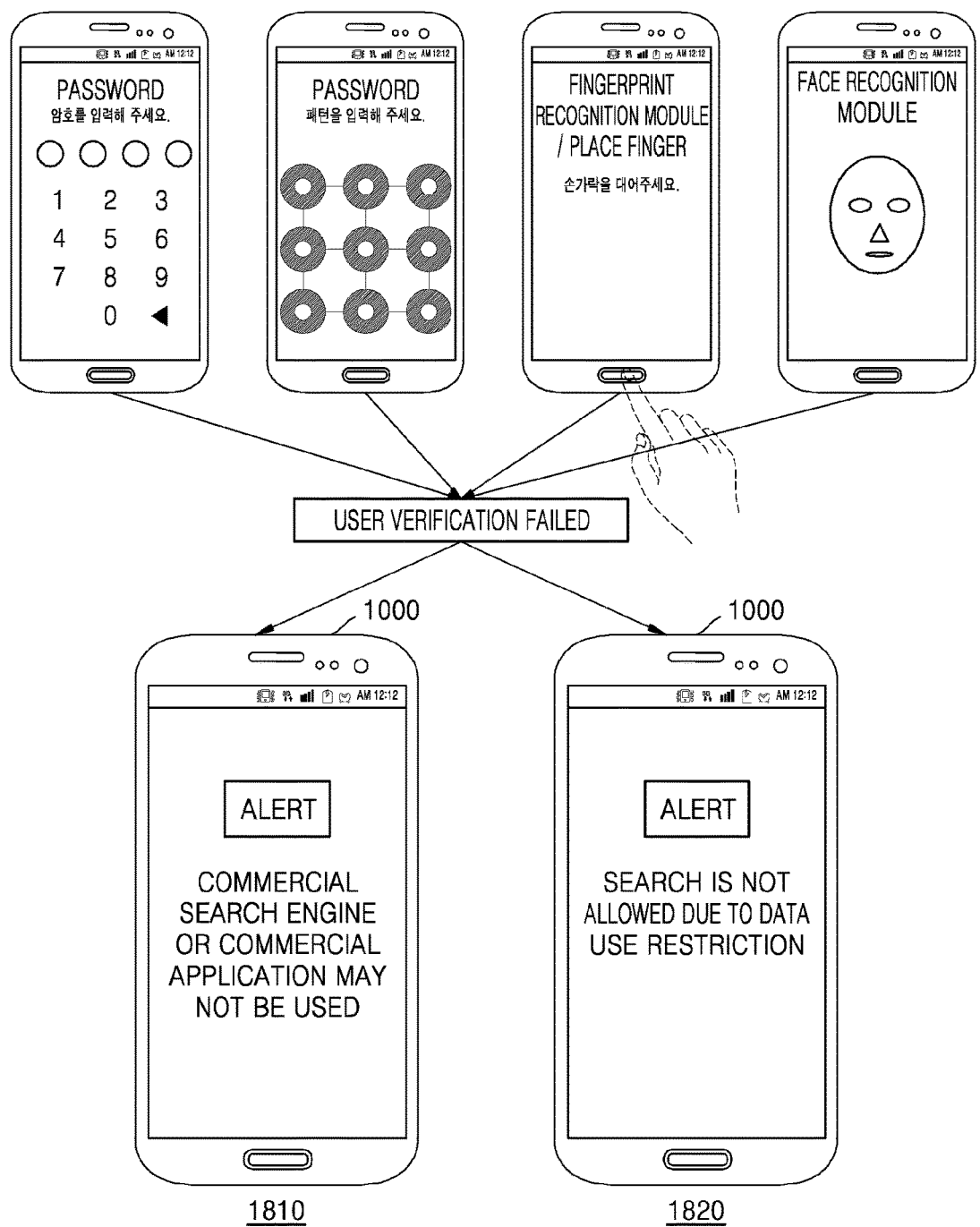
FIG. 18 is a diagram illustrating operations of a terminal when user verification has failed, according to an exemplary embodiment.

FIG. 18 is a diagram illustrating operations of the terminal 1000 when user verification has failed, according to an exemplary embodiment.

As shown in FIG. 18, when the user verification has failed, the terminal 1000 may provide a warning message window. As illustrated in view 1810 of FIG. 18, the terminal 1000 may determine that a mode of the terminal 1000 is not the user mode and display a message window showing "commercial search engine or commercial application may not be used." Alternatively, as shown in view 1820 of FIG. 18, the terminal 1000 may determine that the mode of the terminal 1000 is not the user mode, and display a message window showing "search is not allowed due to data use restriction."

Figure 19:
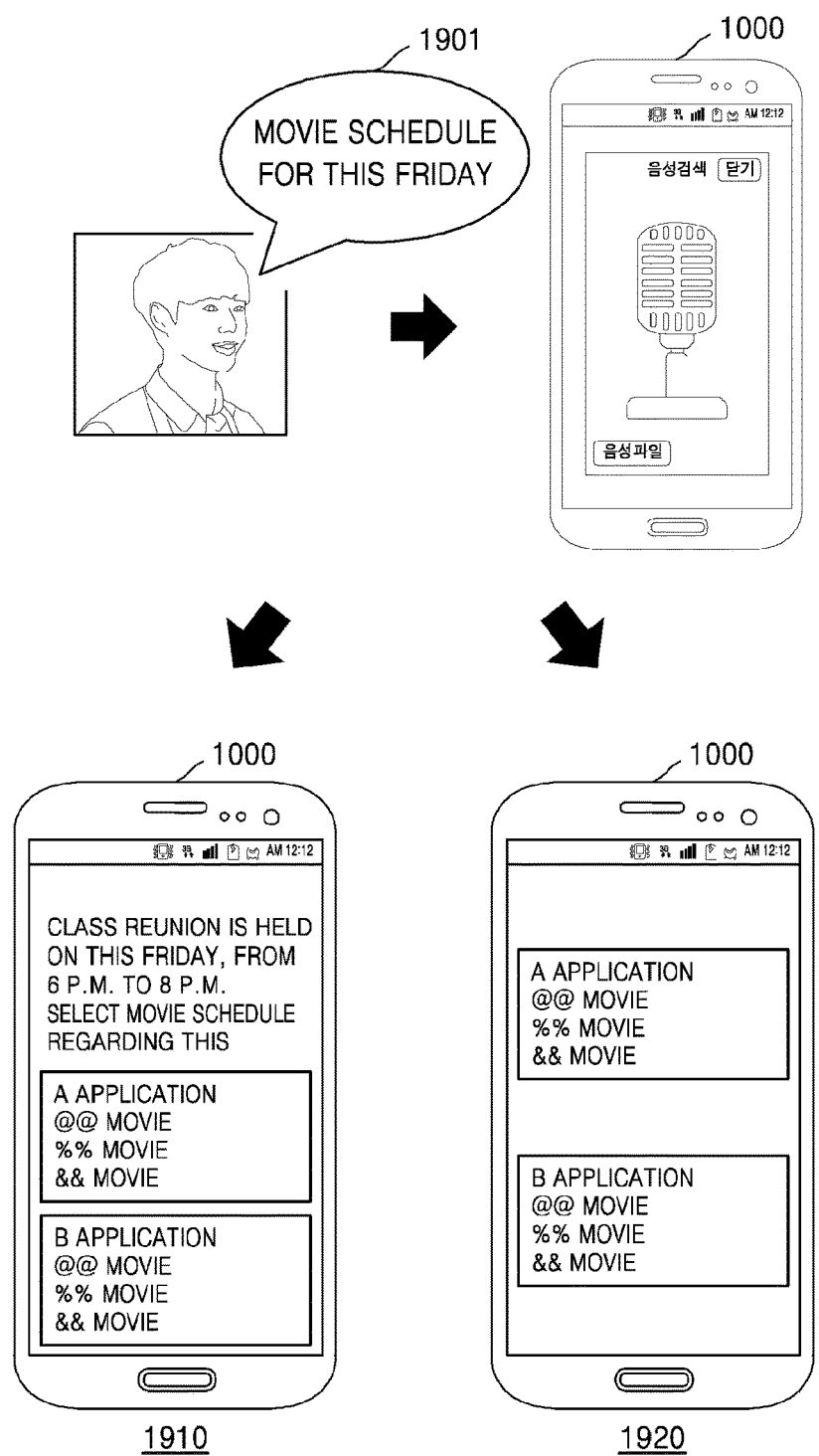
FIG. 19 is a diagram illustrating a method of searching according to a mode of a terminal, according to an exemplary embodiment.

FIG. 19 is a diagram illustrating a method of searching according to a mode of the terminal 1000, according to an exemplary embodiment.

As shown in FIG. 19, the user may say a phrase 1901 "movie schedule for this Friday" to search for a movie schedule. Then, the terminal 1000 may acquire audio data type search information. The terminal 1000 may search based on the acquired search information. The terminal 1000 may search differently according to a mode of the terminal 1000.

Referring to view 1910 of FIG. 19, when the mode of the terminal 1000 is the user mode, the terminal 1000 may search based on the user information. The terminal 1000 may search the phrase 1901 "movie schedule for this Friday" by using a plurality of applications. The terminal 1000 may separately display a search result provided by an "A application" and a search result provided by a "B application." Also, the terminal 1000 may display schedule information of "this Friday" with regard to a user schedule among the user information. The user may conveniently purchase a movie ticket in advance based on the provided search results.

Referring to view 1920 of FIG. 19, when the mode of the terminal 1000 is the guest mode, the terminal 1000 may display search results provided by the plurality of applications without regarding the user information.

Figure 20:
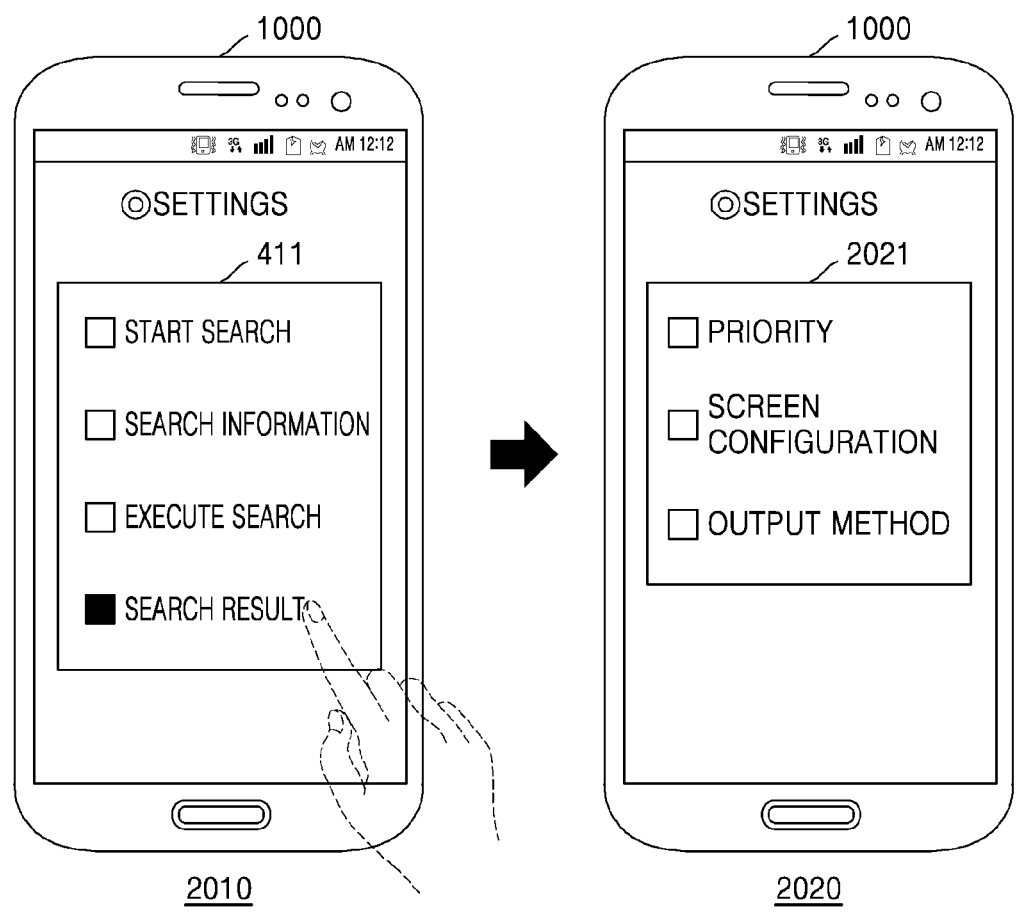
FIG. 20 is a diagram illustrating a method of editing settings in a terminal, according to another exemplary embodiment.

FIG. 20 is a diagram illustrating a method of editing settings in the terminal 1000, according to another exemplary embodiment.

Referring to view 2010 of FIG. 20, the terminal 1000 provides a settings screen. The user may use the settings screen to set search operations. The settings menu 411 of the search operations of the terminal 1000 may include the "start search" option, the "search information" option, the "execute search" option, and the "search result" option. The "search result" option is for setting how the terminal 1000 will provide a search result acquired from information stored in the terminal 1000, a search result acquired from a plurality of applications, and a search result acquired from a plurality of search engines.

Referring to view 2020 of FIG. 20, a submenu 2021 of the "search result" option may include, but is not limited to, a "priority" option, a "screen configuration" option, and an "output method" option. The user may set the "search result" option by selecting at least one option from the submenu 2021.

The "priority" option is related to setting a priority between the information stored in the terminal 1000, the plurality of applications, and the plurality of search engines.

The priority may be set on searching units. Also, the priority may be set according to a method determined by the user. For example, when the priority is set on the searching units, a first application may be a first priority and a first search engine may be second priority. The terminal 1000 may provide a search result provided by the first application first, and provide a search result provided by the first search engine second. As another example, when the priority is set according to a method determined by the user, the priority may be set based on a usage frequency history of an application or a search engine, or based on an application or a search engine used for previous search information.

The "screen configuration" option is related to setting a screen configuration when displaying search results provided via the terminal 1000. The search results may include the information stored in the terminal 1000, search results provided by the plurality of applications, and search results provided by the plurality of search engines. The terminal 1000 may display the search results. The terminal 1000 may provide a list of applications or search engines providing the search results. When the user selects an application or a search engine from the list, the terminal 1000 may display a search result of the application or the search engine selected by the user. The terminal 1000 may distinguishably display the search results that are acquired from the plurality of applications and the plurality of search engines. In this case, the terminal 1000 may provide the search results according to a priority. The terminal 1000 may display the information stored in the terminal 1000, the search results provided by the plurality of applications, and the search results provided by the plurality of search engines terminal 1000 on a single screen.

The "output method" option is related to setting a method of outputting a search result that is provided via the terminal 1000. For example, when the user input audio data type search information, the terminal 1000 may set such that a search result is output as an audio data type. That is, the terminal 1000 may be set such that the search result is provided according to a data type of search information that is input by the user. As another example, even when the user inputs search information to the terminal 1000, the terminal 1000 may be set such that a search result is provided via another terminal, not via 1000.

Figure 21:
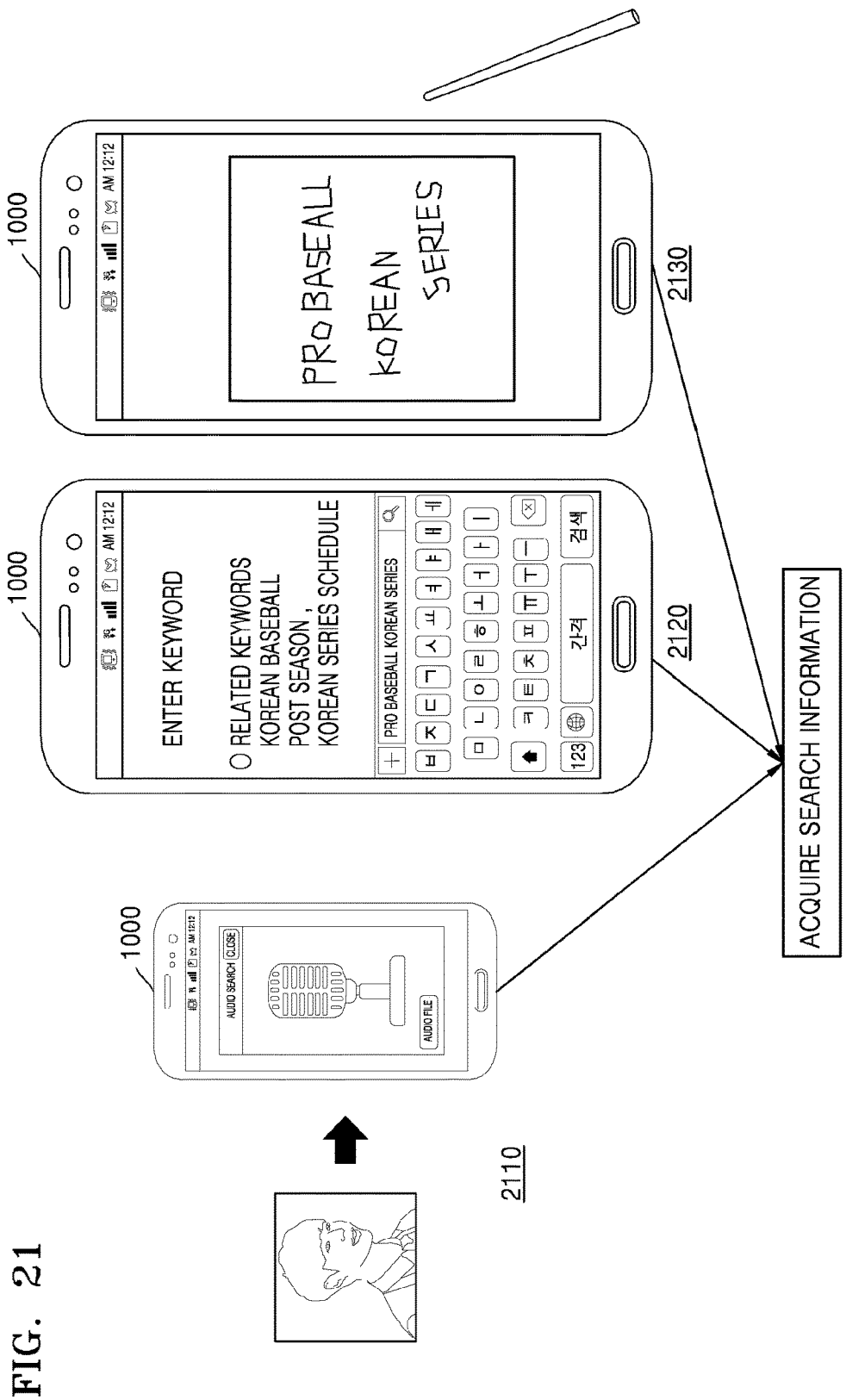
FIG. 21 is a diagram illustrating a method of acquiring at least one data type of search information from a plurality of data types, according to an exemplary embodiment.

FIG. 21 is a diagram illustrating a method of acquiring at least one data type of search information from a plurality of data types, according to an exemplary embodiment.

The user may input a keyword via the terminal 1000 and the terminal 1000 may acquire search information. The terminal 1000 may search based on the acquired search information and provide a search result. The user may input the keyword to the terminal 1000 by using various methods. For example, the user may input the keyword by using at least one input method selected from an audio signal input method via a microphone, a text input method via a text input interface, a touch signal input method via a touch input interface provided in the terminal 1000, an image input method via a camera, and a motion signal input method via a sensor unit for detecting motions.

The user may transmit an audio signal to the terminal 1000 via the microphone. The terminal 1000 may detect the audio signal of the user and acquire search information. Then, the terminal 1000 may detect that a date type of the search user information is an audio signal, and transmit the search information to a search engine that searches by using audio signals. After receiving the search information, the search engine searches based on the search information. The search engine may transmit a search result to the terminal 1000.

The user may input text via the text unit provided in the terminal 1000. The terminal 1000 may acquire search information from the input text data. The terminal 1000 may transmit the search information to a search engine that searches by using text data.

Referring to view 2110 of FIG. 21, the user may transmit an audio signal "pro baseball Korean series" to the terminal 1000 via the microphone. The terminal 1000 may acquire "pro baseball Korean series" as search information. In this case, a date type of the search information is audio data. The terminal 1000 may search by using an application corresponding to the audio data type. Alternatively, the terminal 1000 may convert the audio data type to a text data type, and search by using an application corresponding to the text data type.

Referring to view 2120 of FIG. 21, the user may input "pro baseball Korean series" via the text input interface. The terminal 1000 may acquire text data "pro baseball Korean series" as search information. The terminal 1000 may search by using an application corresponding to the text data type. Alternatively, the terminal 1000 may convert the text data type to an audio data type, and search by using an application corresponding to the audio data type.

Referring to view 2130 of FIG. 21, the user may input a touch signal "pro baseball Korean series" via the touch input interface. The terminal 1000 may acquire a touch signal "pro baseball Korean series" as search information. The terminal 1000 may search by using an application corresponding to the touch signal type. Alternatively, the terminal 1000 may convert the touch signal type to a text data type, and search by using an application corresponding to the text data type.

FIGS. 22, 23, 24, and 25 are diagrams illustrating operations of the terminal 1000 and screens of the terminal 1000 providing search results, according to an exemplary embodiment.

Figure 22:
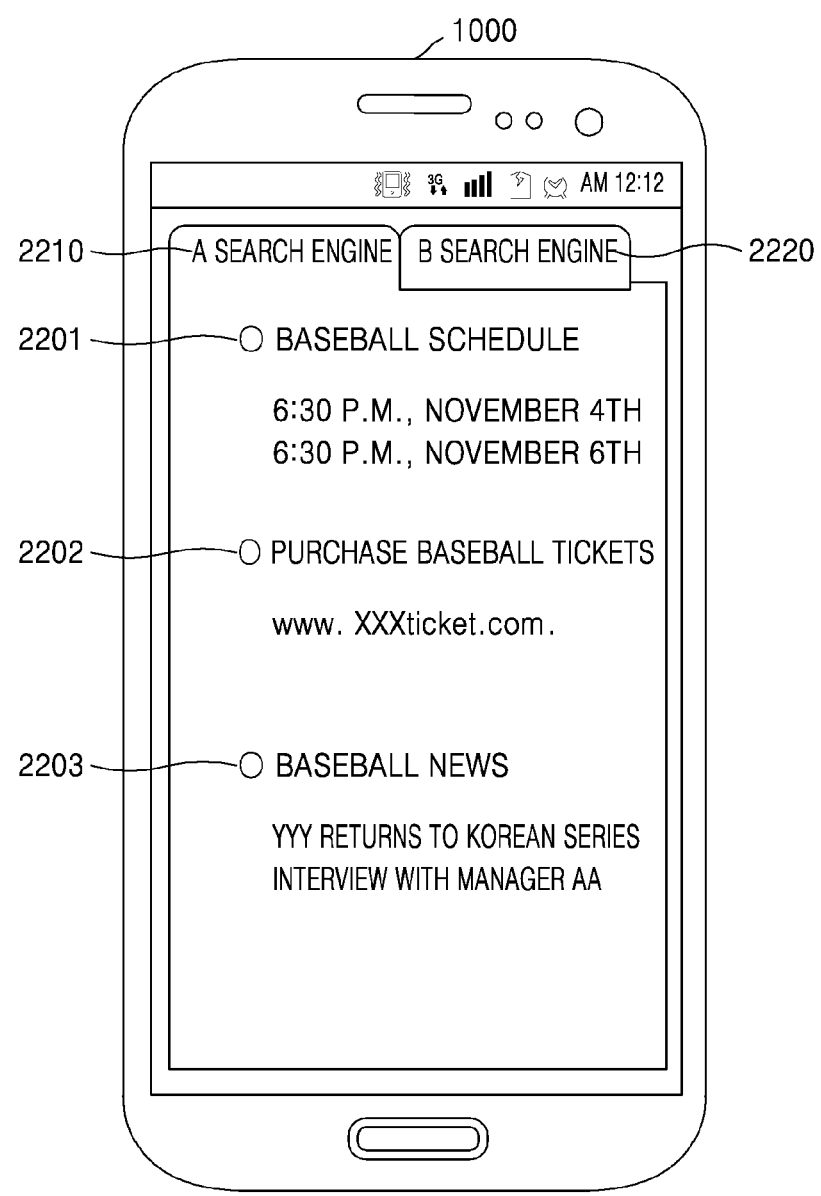
FIGS. 22, 23, 24, and 25 are diagrams illustrating operations of a terminal and screens of the terminal providing search results, according to an exemplary embodiment.

FIG. 22 is a screen of the terminal 1000 providing search results acquired from a plurality of search engines. As described with reference to FIG. 21, the terminal 1000 searches having "pro baseball Korean series" set as the search information. The terminal 1000 may search by using the plurality of search engines, and acquire a search result from each of the plurality of search engines. The terminal 1000 may display a search result acquired from an "A search engine" 2210 on a tab, and display a search result acquired from a "B search engine" 2220 on another tab. The terminal 1000 may provide the two tabs on a screen. In this case, the screen of the terminal 1000 may provide a tab of a search result acquired from only a single search engine. The user may select a tab and see a search result of a search engine that corresponds to the selected tab. When the user selects the tab "A search engine" 2210, the user may see a search result including a baseball schedule 2201, a baseball ticket purchase 2202, and baseball news 2203.

Figure 23:
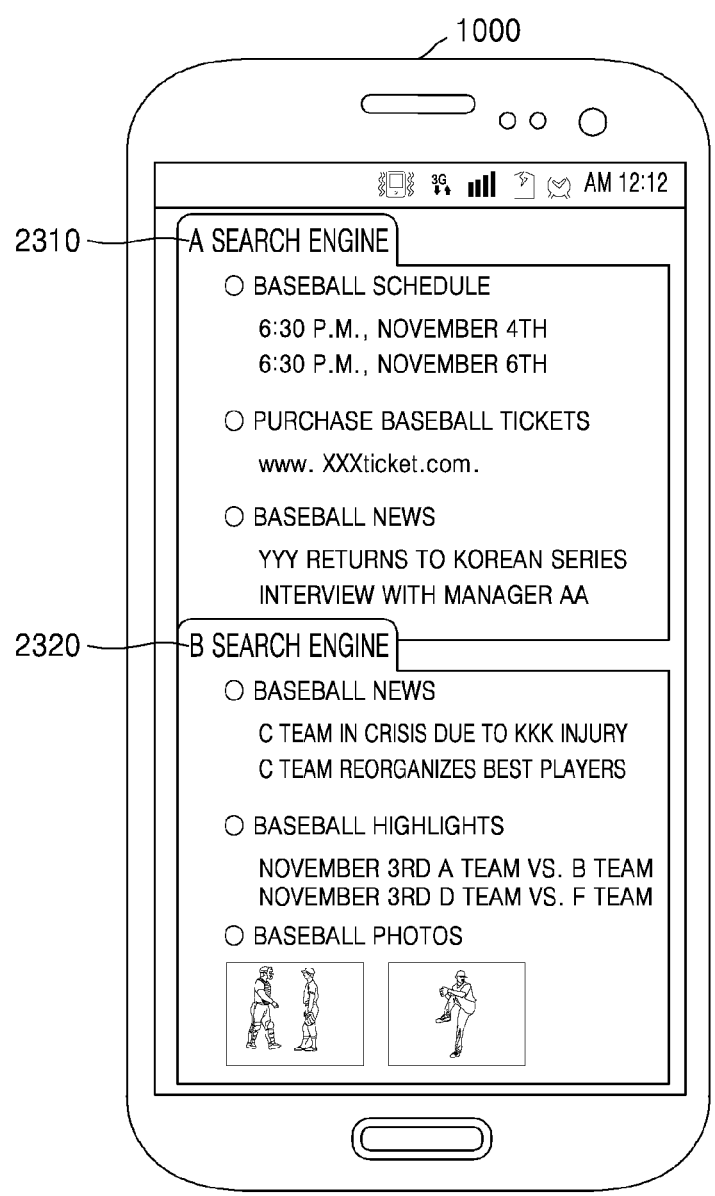

FIG. 23 is another screen of the terminal 1000 providing the search results acquired from the plurality of search engines. The terminal 1000 may display a search result acquired from an "A search engine" 2310 on a tab, and display a search result acquired from a "B search engine" 2320 on another tab. The terminal 1000 may display the search results acquired from the two search engines on a single screen, but use two tabs so that the search results are distinguishable. As shown in FIG. 23, the search result acquired from the "B search engine" 2320 includes baseball news, baseball highlights, and baseball photographs.

Figure 24:
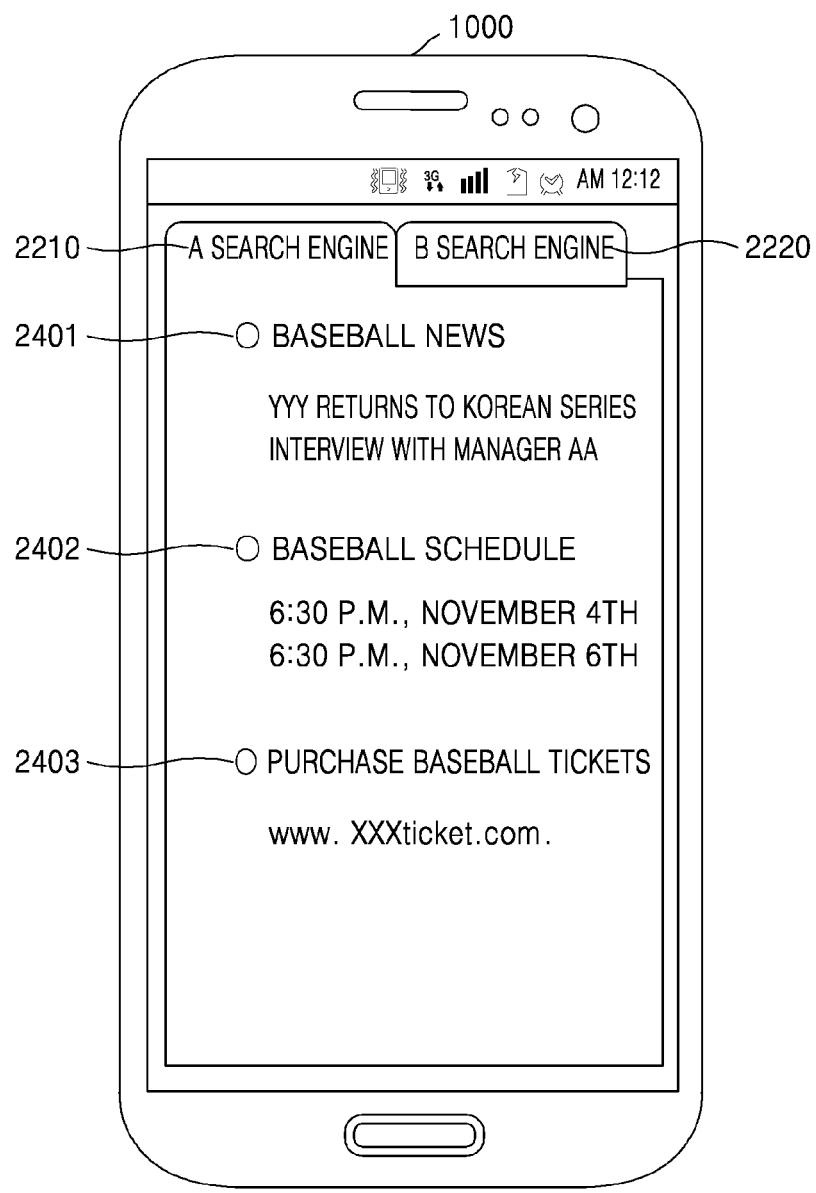

FIG. 24 is another screen of the terminal 1000 providing the search results acquired from the plurality of search engines. The terminal 1000 may search by using identical search information and identical search engines (the A search engine 2210 and the B search engine 2220), but may differently display the search results according to users. For example, with regard to baseball search information, a first user may set the baseball schedule 2201 as a first priority and a second user may set baseball news 2401 as a first priority. The first and second users may input "pro baseball Korean series" as search information, and the terminal 1000 of each user may search. Because the first user sets the "baseball schedule" 2201 as the first priority, the terminal 1000 of the first user may set a screen to show a search result of the "baseball schedule" 2201 as the first priority. However, because the second user sets the "baseball news" 2401 as the first priority, the terminal 1000 of the second user may set a screen to show a search result of the "baseball news" 2401 as the first priority That is, even when an identical search result is provided from an identical search engine, the terminal 1000 of the first user may provide the search results in the order of the baseball schedule 2201, the baseball ticket purchase 2202, and the baseball news 2203, whereas the terminal 1000 of the second user may provide the search results in the order of the baseball news 2401, a baseball schedule 2402, and a baseball ticket purchase 2403.

Figure 25:
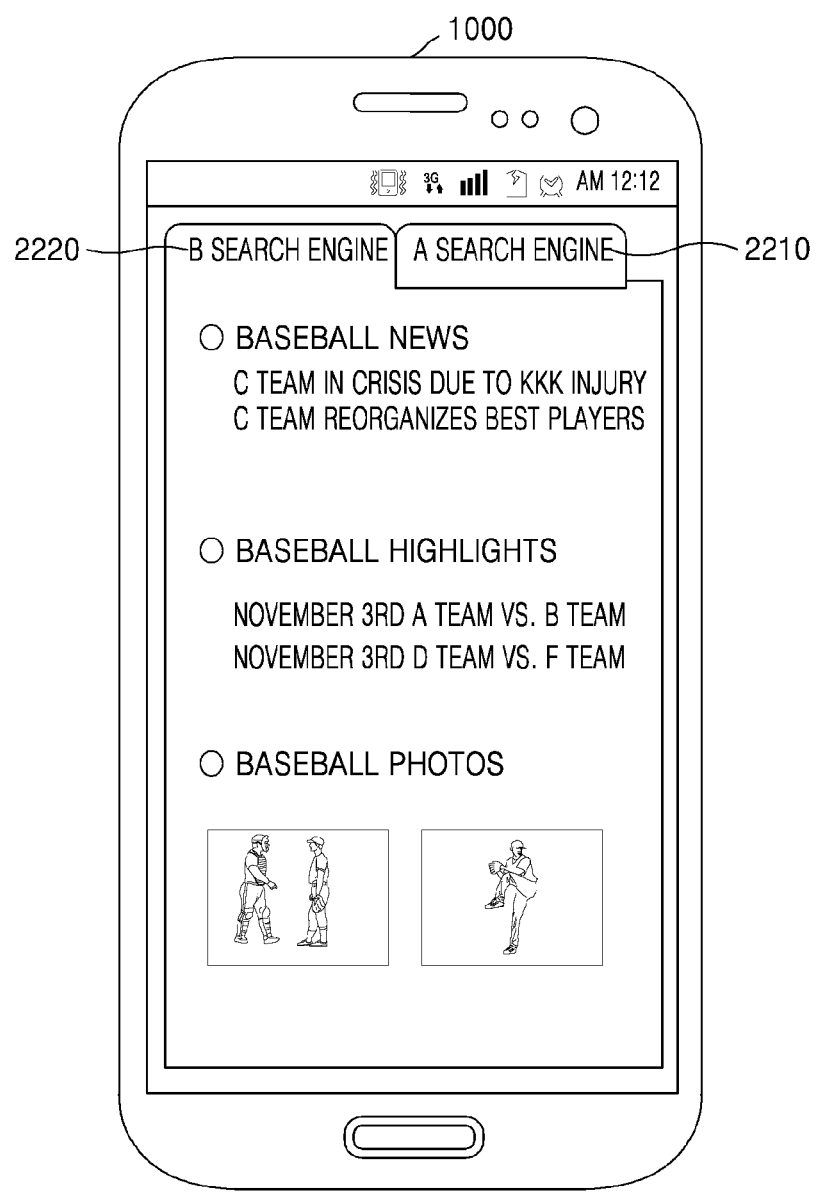

FIG. 25 is another screen of the terminal 1000 providing the search results acquired from the plurality of search engines. The terminal 1000 may display the search result from the "A search engine" 2210 on a tab, and display the search result acquired from the "B search engine" 2220 on another tab. The terminal 1000 may display two tabs on a screen. The user may set the terminal 1000 to provide the search result of the "B search engine" 2220 before the search result of the "A search engine" 2210. That is, even when identical search results are provided via the terminal 1000, the terminal 1000 may provide the search results by setting the screen according to a priority set by the user.

FIGS. 26, 27, 28, 29, and 30 are diagrams illustrating operations of the terminal 1000 searching with regard to a user's schedule, according to an exemplary embodiment.

Figure 26:
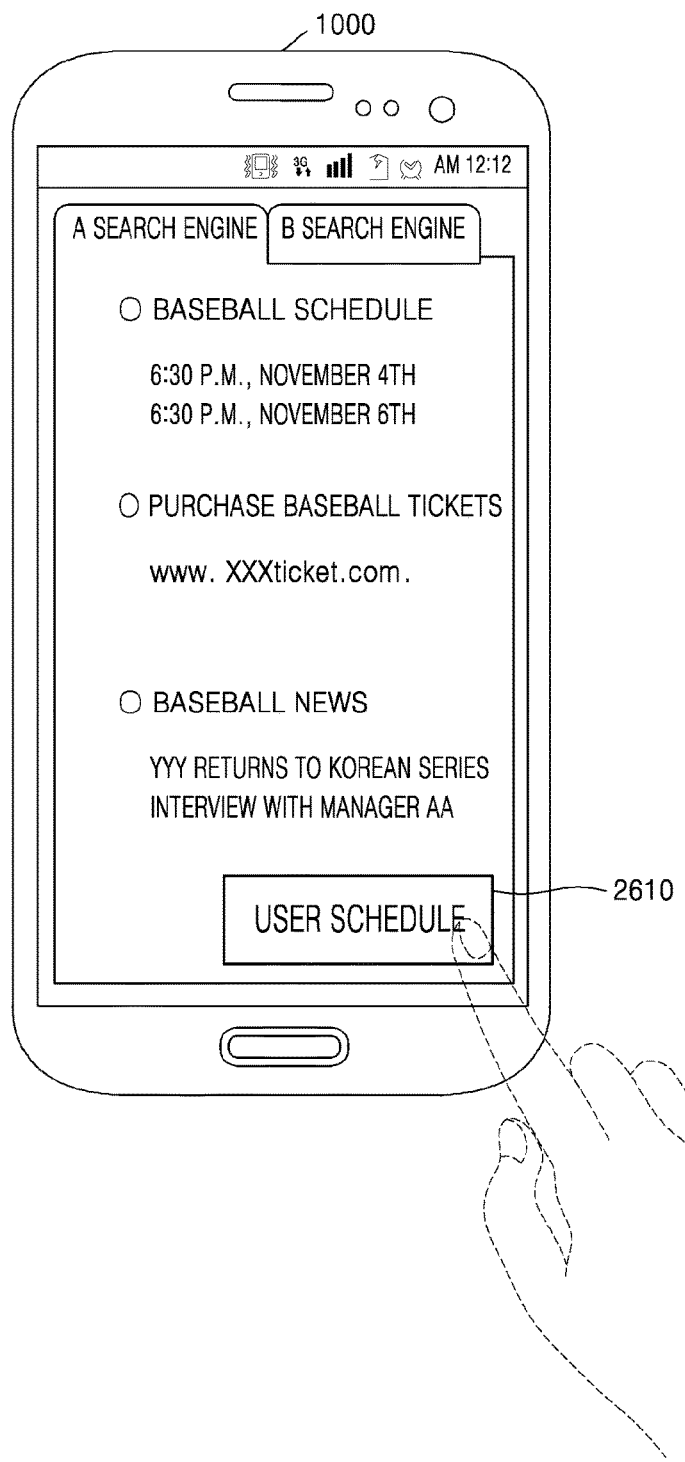

FIG. 26 is a screen of the terminal 1000 providing search results acquired from a plurality of search engines. While providing a search result acquired from an "A search engine" and a search result acquired from a "B search engine," the terminal 1000 may provide an entry field 2610 for the user to select with regard to a user schedule. The entry field 2610 may acquire an input when the user touches the entry field 2610. Although the user schedule is shown in FIG. 26, the entry field 2610 for selecting user information may be provided so that user information other than the user schedule may be regarded. The user information may include personal user information that is stored in the terminal 1000 by the user. The user may identify the user schedule to purchase a baseball ticket. When an input of selecting the user schedule cannot be received for a time, the terminal 1000 may be set such that the entry field 2610 for selecting the user schedule disappears from the screen of the terminal 1000, or, even when the input of selecting the user schedule is received, the input may be set as an invalid input.

FIG. 27 shows a schedule 2710 of the user. As shown in FIG. 27, a company dinner 2701 is held at 7 p.m. of November 6$^{th}$. Therefore, the company dinner 2701 overlaps a baseball game starting at 6:30 p.m. of November 6$^{th}$.

Figure 28:
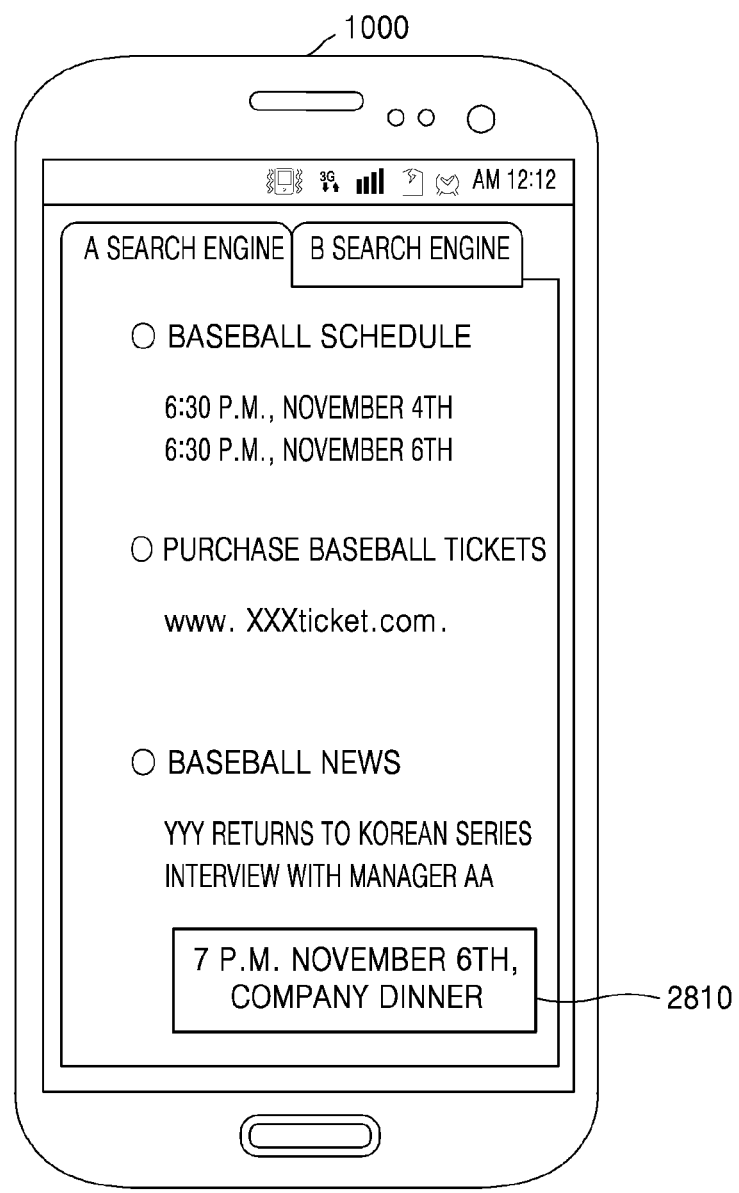

FIG. 28 is a screen of the terminal 1000 providing the search results acquired from the plurality of search engines and user schedule information. The terminal 1000 may provide information of all user schedules with the search results. Alternatively, the terminal 1000 may select user schedule information based on the search results, and provide the selected user schedule information. The terminal 1000 may identify from the search results that baseball games are played at 6:30 p.m. on November 4$^{th}$ and at 6:30 p.m. on November 6$^{th}$. The terminal 1000 may search the user schedule information based on the baseball game schedule. After searching the user schedule information, the terminal 1000 may acquire information indicating that the user does not have a plan on November 4$^{th}$ and information indicating that a company dinner is to be held at 7 p.m. on November 6$^{th}$. The terminal 1000 may compare the search results acquired from the search engines and the search results acquired from the user schedule, and extract user schedule information to be provided. The terminal 1000 may extract overlapping schedules from the user schedule information. The terminal 1000 may provide a message window 2810 showing "company dinner at 7 p.m. on November 6$^{th}$."

Even when an input of selecting based on the search results provided by the terminal 1000 is not received from the user, the terminal 1000 may select user schedule information based on the search result and provide the selected user schedule information. Referring to FIG. 28, even when the user does not click or touch 6:30 p.m. on November 6$^{th}$, the terminal 1000 may compare the baseball game schedule and the user schedule, and provide information of overlapping user schedules.

Alternatively, when an input of selecting a search result is received from the user, the terminal 1000 may select user schedule information based on the input from the user and provide the selected user schedule information. Referring to FIG. 28, when the user clicks or touches 6:30 p.m. on November 6$^{th}$, the terminal 1000 may provide information of a user schedule that overlaps the baseball game schedule.

Figure 29:
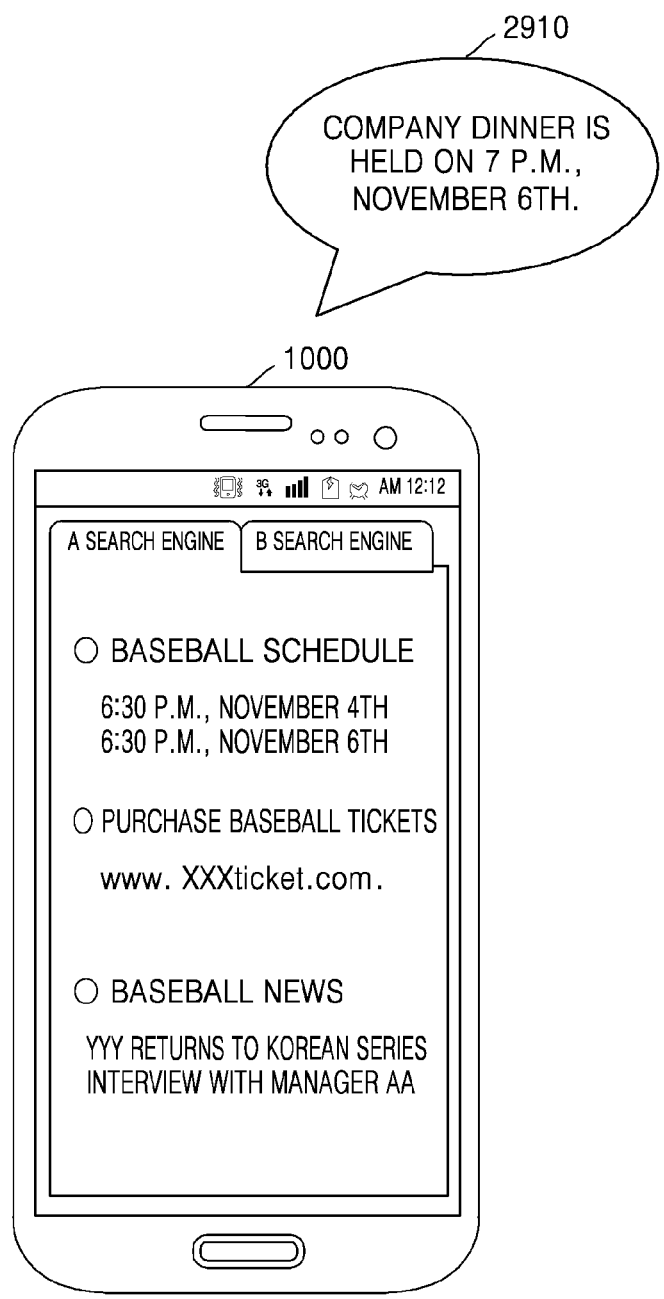

FIG. 29 is a diagram illustrating the terminal 1000 that provides the search results acquired from the plurality of search engines and the user schedule information. When a user schedule overlaps search results acquired from the plurality of search engines, the terminal 1000 may extract and provide an overlapping user schedule. In this case, the terminal 1000 may provide the overlapping user schedule via a message window as shown in FIG. 28, or provide it via an audio message 2910 as shown in FIG. 29. When the user is unable to see the terminal 1000, the terminal 1000 may provide a user schedule that overlaps the search result via the audio message 2910.

Figure 30:
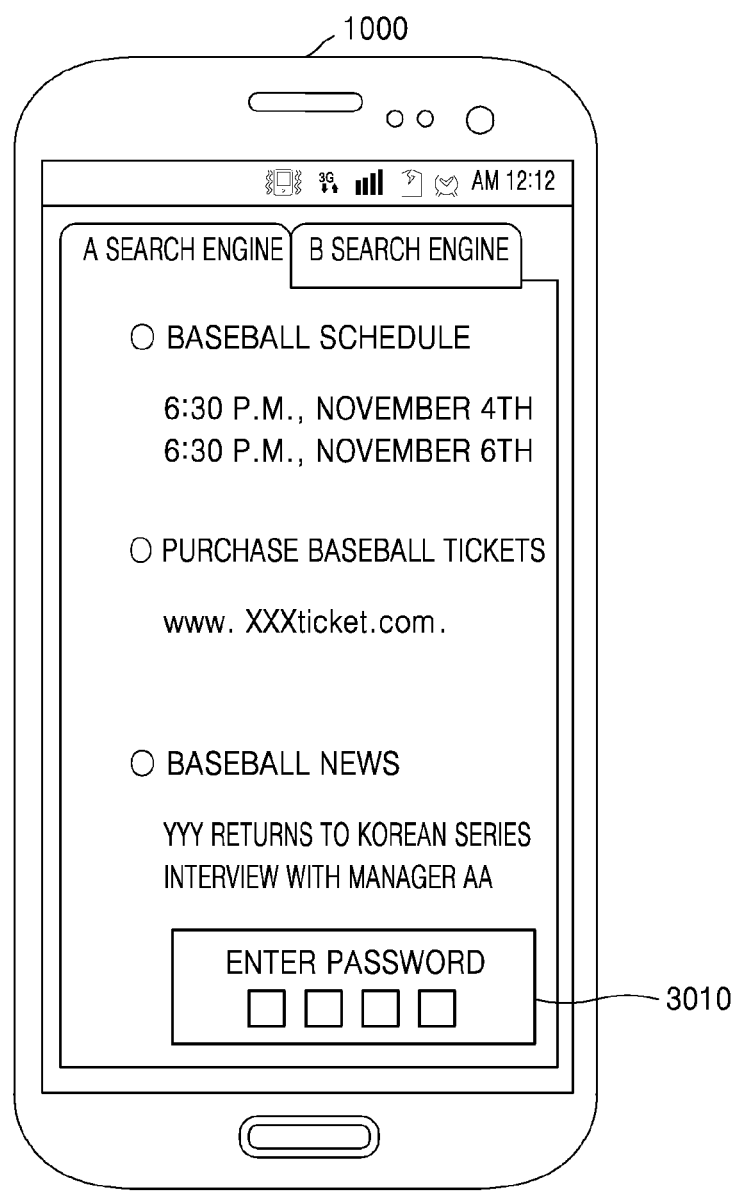

FIG. 30 is a diagram illustrating the terminal 1000 that provides the search results acquired from the plurality of search engines and the user schedule information. Before providing the user schedule information, the terminal 1000 may perform a user verification process. As shown in FIG. 30, the user verification process may be performed by receiving a password 3010. Other than receiving the password, the user verification process may be performed by using at least one selected from a pattern input, a fingerprint input, and face recognition. When the user is verified, the terminal 1000 may identify whether a user schedule overlaps the search results acquired from the plurality of search engines, extract an overlapping user schedule, and provide the overlapping user schedule. When the user is not verified, the terminal 1000 may not provide the user schedule information, and only provide the search results acquired from the plurality of search engines.

Figure 31:
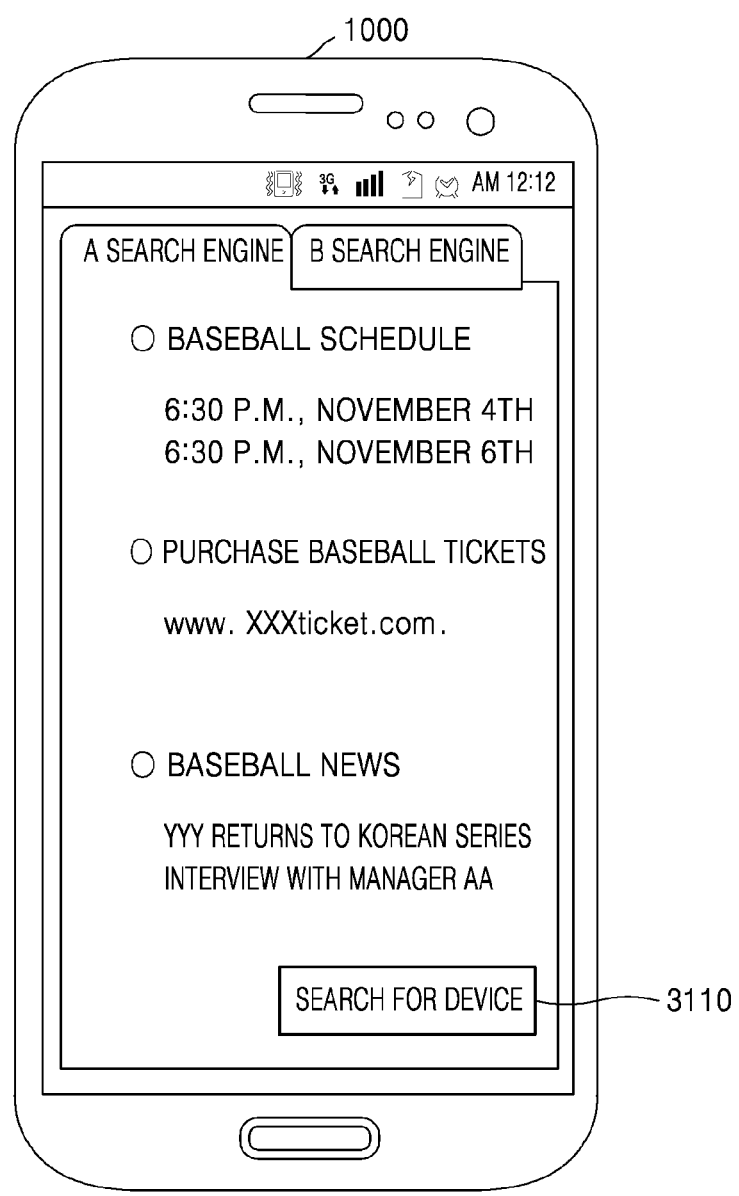
FIGS. 31 and 32 are diagrams illustrating operations of transferring a search result to another terminal, according to an exemplary embodiment.
Figure 32:
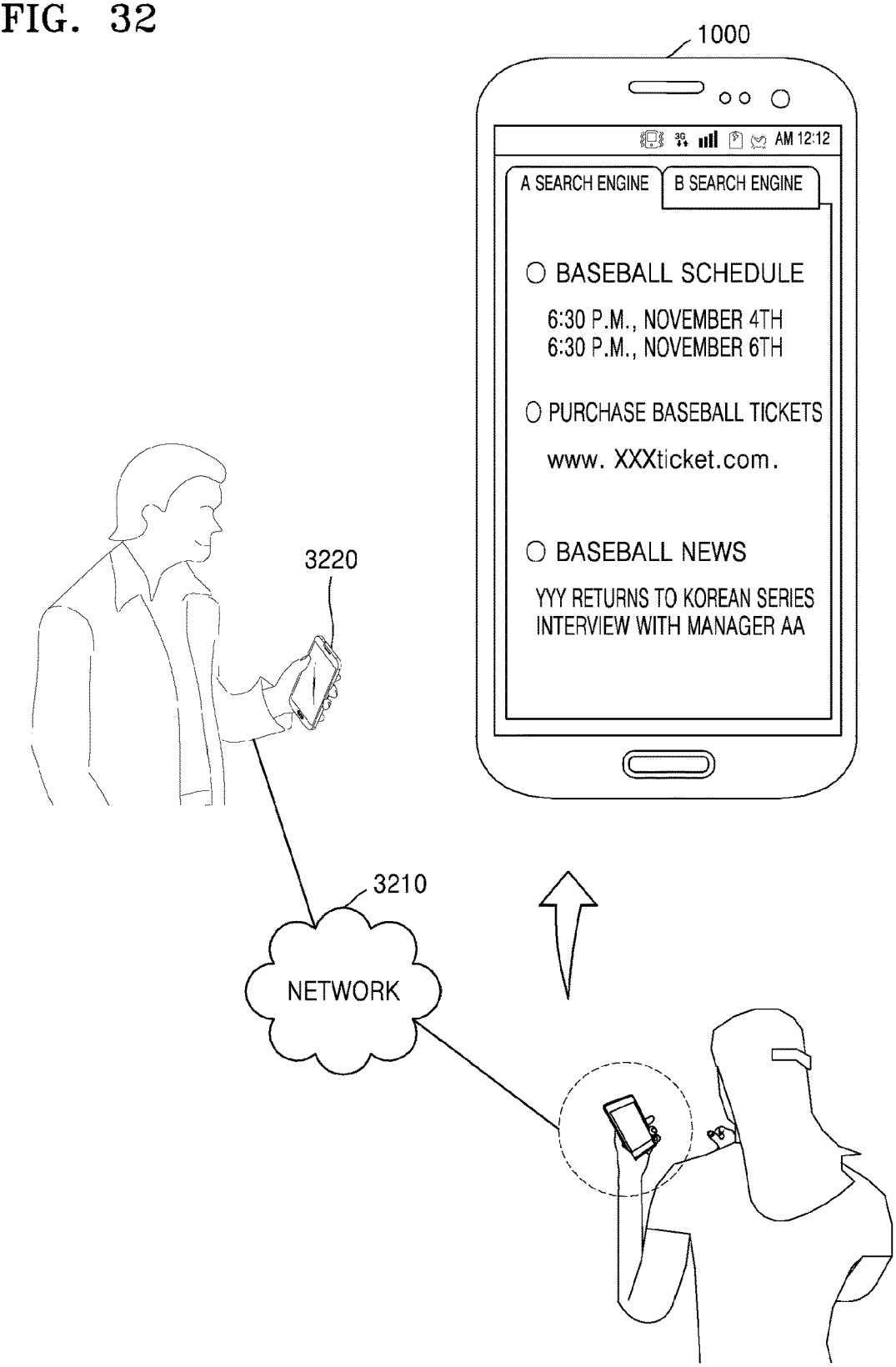

FIGS. 31 and 32 are diagrams illustrating operations of transferring a search result to another terminal, according to an exemplary embodiment.

Referring to FIG. 31, the terminal 1000 may search for another terminal to transfer the search results acquired from the plurality of search engines. The other terminal may be, but is not limited to, a cellular phone, a smartphone, a laptop computer, a tablet PC, an e-book terminal device, a digital broadcast terminal device, a PDA, a PMP, a navigation device, an MP3 player, or a digital camera.

The terminal 1000 may provide a command window 3110 for searching a device on a layer that is the same as or different from a layer for providing the search results. When an input of searching for a device is received, the terminal 1000 may search for another terminal connected to the terminal 1000 via a network. Alternatively, the terminal 1000 may receive, from the user, an input of selecting another terminal to which the search results are transmitted.

When the input of searching for a device cannot be received for a time, the terminal 1000 may be set such that the command window 3110 disappears from the screen of the terminal 1000, or, even when the input of searching for a device is received, set the input as an invalid input.

Referring to FIG. 32, the terminal 1000 may transmit the search results acquired from the plurality of search engines to another terminal 3220 via a network 3210. The network 3210 may be formed by using wired communication technology, or wireless communication technology, for example, Wi-Fi, home radio frequency (RF), Bluetooth, High Rate Wireless Personal Area Network (HR WPAN), Ultra Wide Band (UWB), Low Rate (LR) WPAN, Institute of Electrical and Electronics Engineers 1394 (IEEE 1394), and ZigBee.

FIGS. 33, 34, 35, 36, 37, and 38 are diagrams illustrating operations of the terminal 1000 and screens of the terminal 1000 providing search results, according to an exemplary embodiment.

Figure 33:
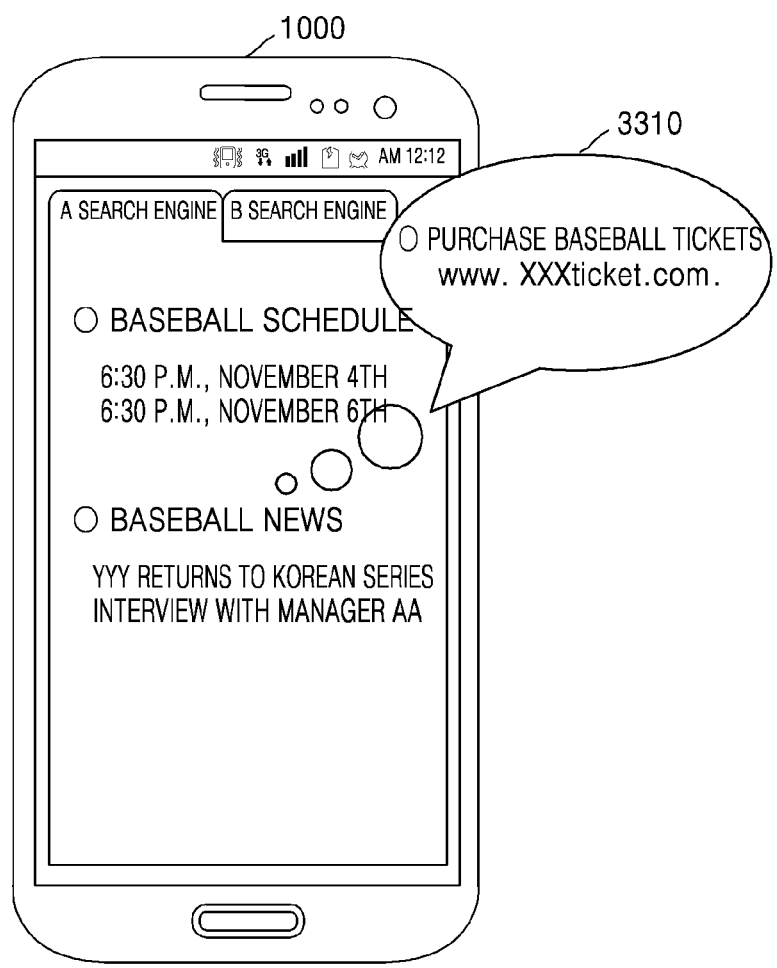
FIGS. 33, 34, 35, 36, 37, and 38 are diagrams illustrating operations of a terminal and screens of the terminal providing search results, according to an exemplary embodiment.

FIG. 33 shows the terminal 1000 providing search results acquired from the plurality of search engines. FIGS. 33 and 22 illustrate the terminal 1000 that provides a search result of "pro baseball Korean series" by using the "A search engine." Although the same search information and the same search engine are used, screen configurations of the terminal 1000 are different. Referring to FIG. 33, unlike FIG. 22, a search result 3310 of "baseball ticket purchase" is deleted. The user may set the terminal 1000 in advance so that only a desired search result is displayed. Also, the user may set the terminal 1000 so that a predetermined range is excluded from a search range. For example, when the user sets the terminal 1000 so that the search result 3310 of "baseball ticket purchase" is excluded from the search range, the terminal 1000 may provide search results without the search result 3310 of "baseball ticket purchase."

Figure 34:
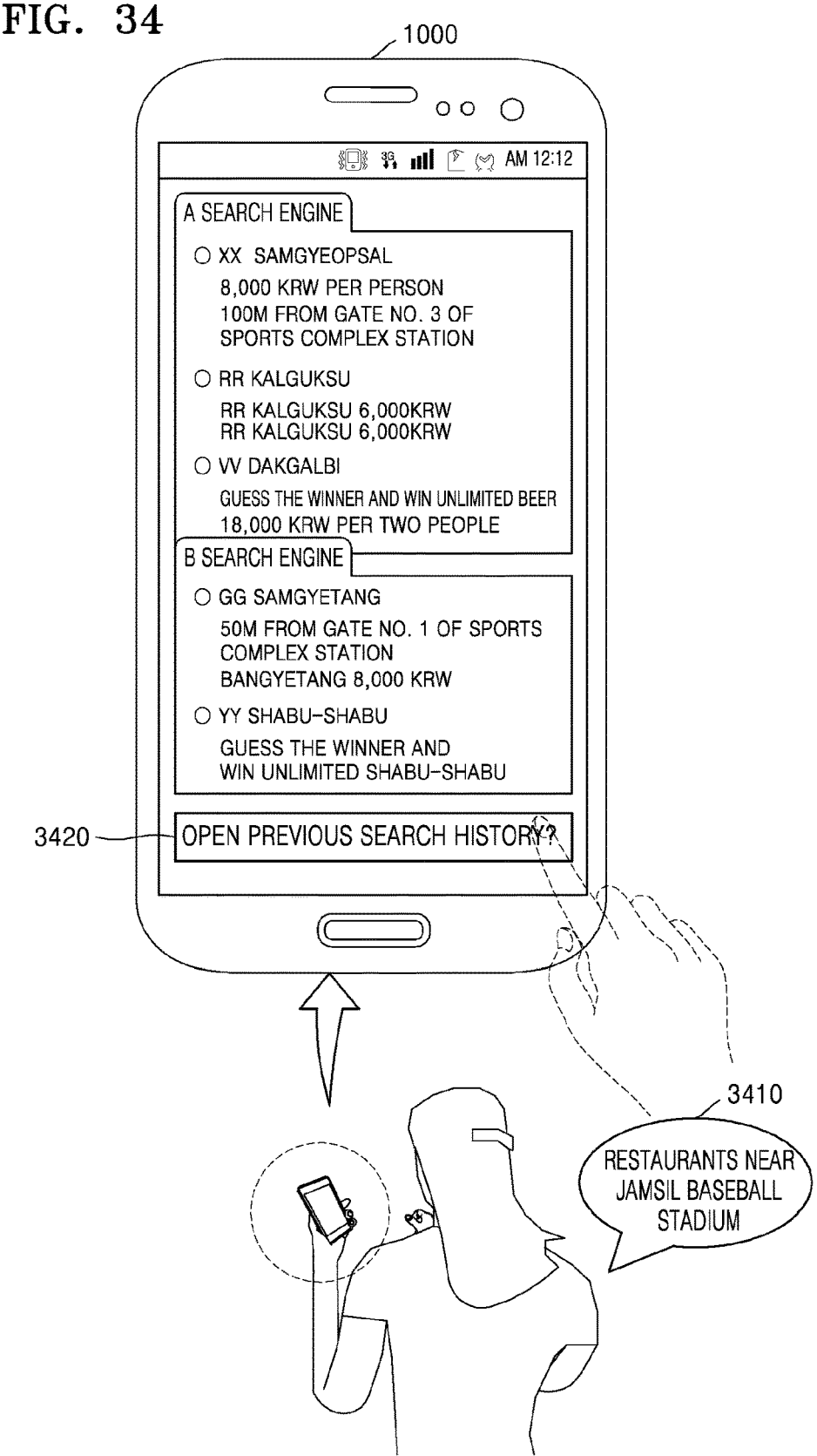

FIG. 34 is a diagram illustrating the terminal 1000 providing the search results acquired from the plurality of search engines by using a search history.

The user may transmit an audio signal 3410 "restaurants near Jamsil baseball stadium" to the terminal 1000 via a microphone. The terminal 1000 may acquire "restaurants near Jamsil baseball stadium" as search information. In this case, a data type of the search information is an audio data type. The terminal 1000 may search by using an application corresponding to the audio data type. Alternatively, the terminal 1000 may convert the audio data type to a text data type, and search by using an application corresponding to the text data type.

The terminal 1000 may search by using search engines for recommending restaurants, i.e., an "A search engine" and a "B search engine." The terminal 1000 may display a search result acquired from the "A search engine" on a tab, and display a search result acquired from the "B search engine" on another tab. The terminal 1000 may provide the search results acquired from the two search engines on a single screen, but use two tabs so that the search results are distinguishable.

Also, the terminal 1000 may additionally provide a search result by using a search history of the user. As shown in FIG. 34, the terminal 1000 may provide a message window 3420 showing "open search history." In response to the message window 3420, the user may touch or use other methods to input a signal that approves the question on the message window 3420.

Figure 35:
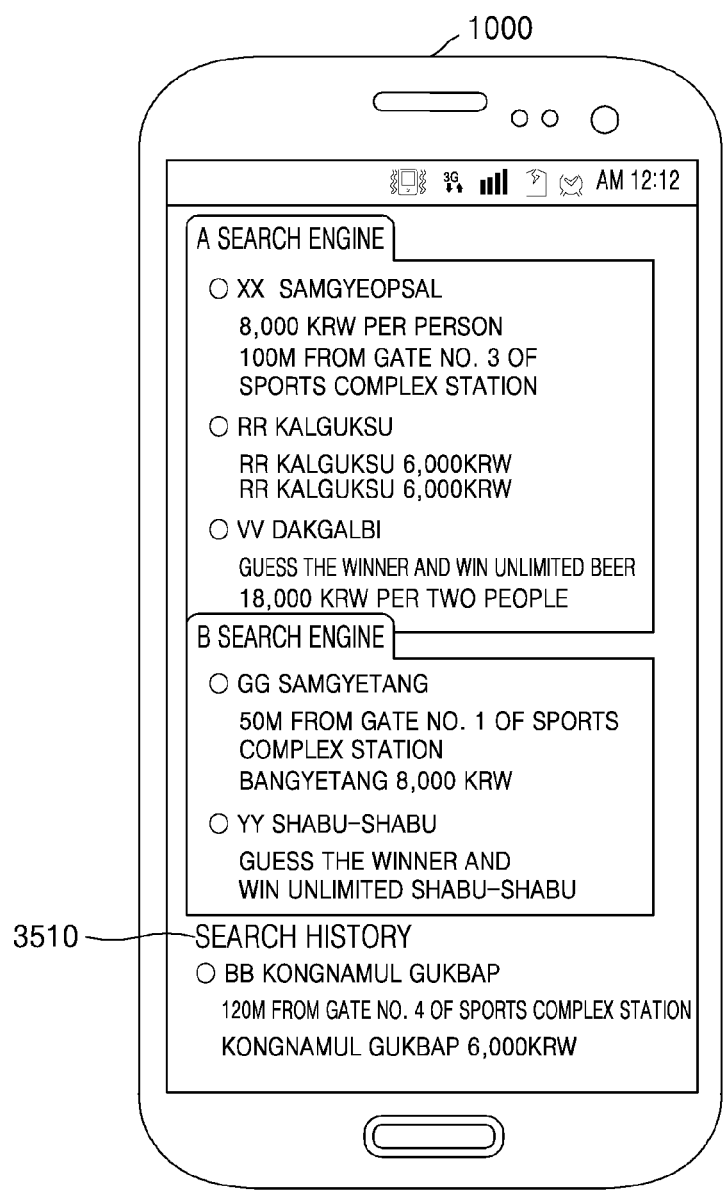

FIG. 35 illustrates the terminal 1000 that provides a search history and search results acquired from the plurality of search engines.

Referring to FIG. 35, restaurants provided by the "A search engine" include XX Samgyeopsal, RR Kalguksu, and VV Dakgalbi, and restaurants provided by the "B search engine" include GG Samgyetang and YY Shabu-shabu. The terminal 1000 may provide restaurant information based on a search history 3510 of the user. Among restaurants in the search history 3510, the terminal 1000 may provide information of restaurants other than the restaurants provided by the "A search engine" and the "B search engine." The terminal 1000 may provide information of BB Kongnamul Gukbap.

Figure 36:
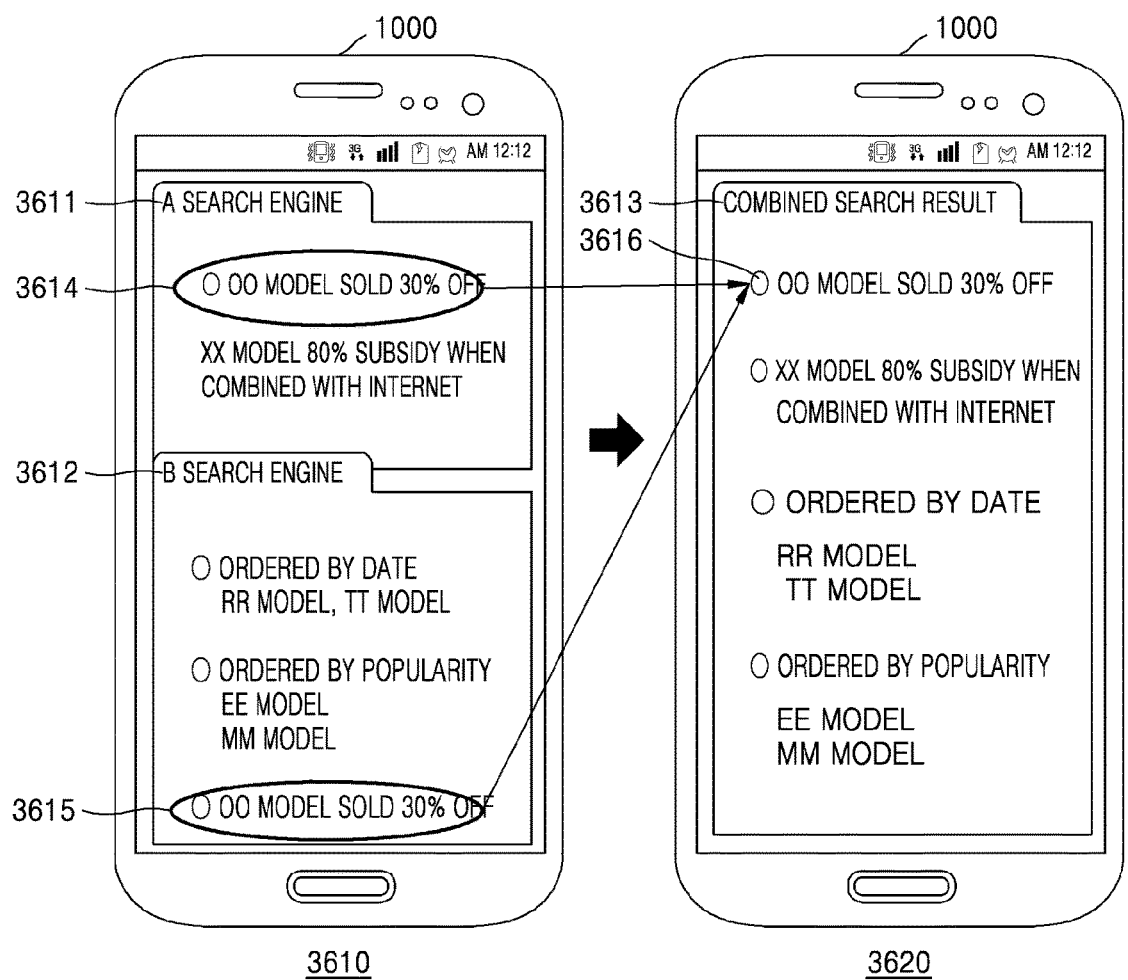

FIG. 36 illustrates the terminal 1000 that provides search results acquired from the plurality of search engines.

Referring to view 3610 of FIG. 36, the terminal 1000 may acquire a search result from each of the plurality of search engines. The terminal 1000 may separately provide a search result acquired from an "A search engine" 3611 and a search result acquired from a "B search engine" 3612.

Referring to view 3620 of FIG. 36, the terminal 1000 may provide a combined search result 3613 by combining the search result acquired from the "A search engine" 3611 and the search result acquired from the "B search engine" 3612. In this case, a phrase 3614 "OO model sold 30% off" from the search result acquired from the "A search engine" 3611 and a phrase 3615 "OO model sold 30% off" from the search result acquired from the "B search engine" 3612 overlap. When the terminal 1000 provides the combined search result 3613, only one of the overlapping search results may be provided as a search result 3616.

Figure 37:
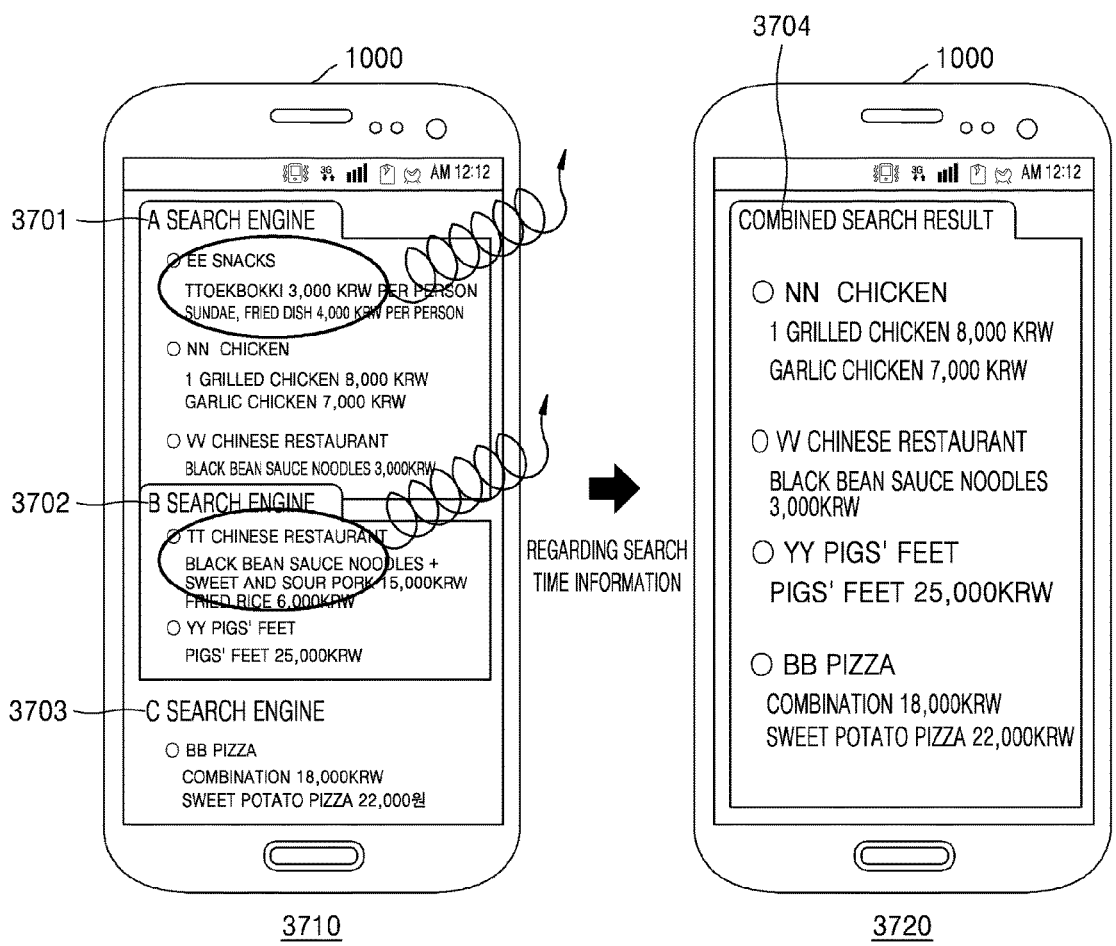

FIG. 37 is a diagram for illustrating search results acquired from the plurality of search engines with regard to search time information.

Referring to view 3710 of FIG. 37, when the user inputs "late night food" via a text input interface, the terminal 1000 may transmit text data to search engines that search by using text data (an "A search engine" 3701, a "B search engine" 3702, and a "C search engine" 3703). The "A search engine" 3701, the "B search engine" 3702, and the "C search engine" 3703 may search by using a keyword "late night food," and transmit search results to the terminal 1000. Referring to view 3720 of FIG. 37, the terminal 1000 may reorganize the search results based on search time information into a combined search result 3704. For example, when the user has searched by using the keyword "late night food" at 10 p.m., some restaurants may have closed before 10 p.m. The terminal 1000 may provide restaurants other than restaurants that have closed before 10 p.m. on the combined search result 3704. However, business hours of restaurants have to be stored in an internal storage device of the terminal 1000 in advance.

Figure 38:
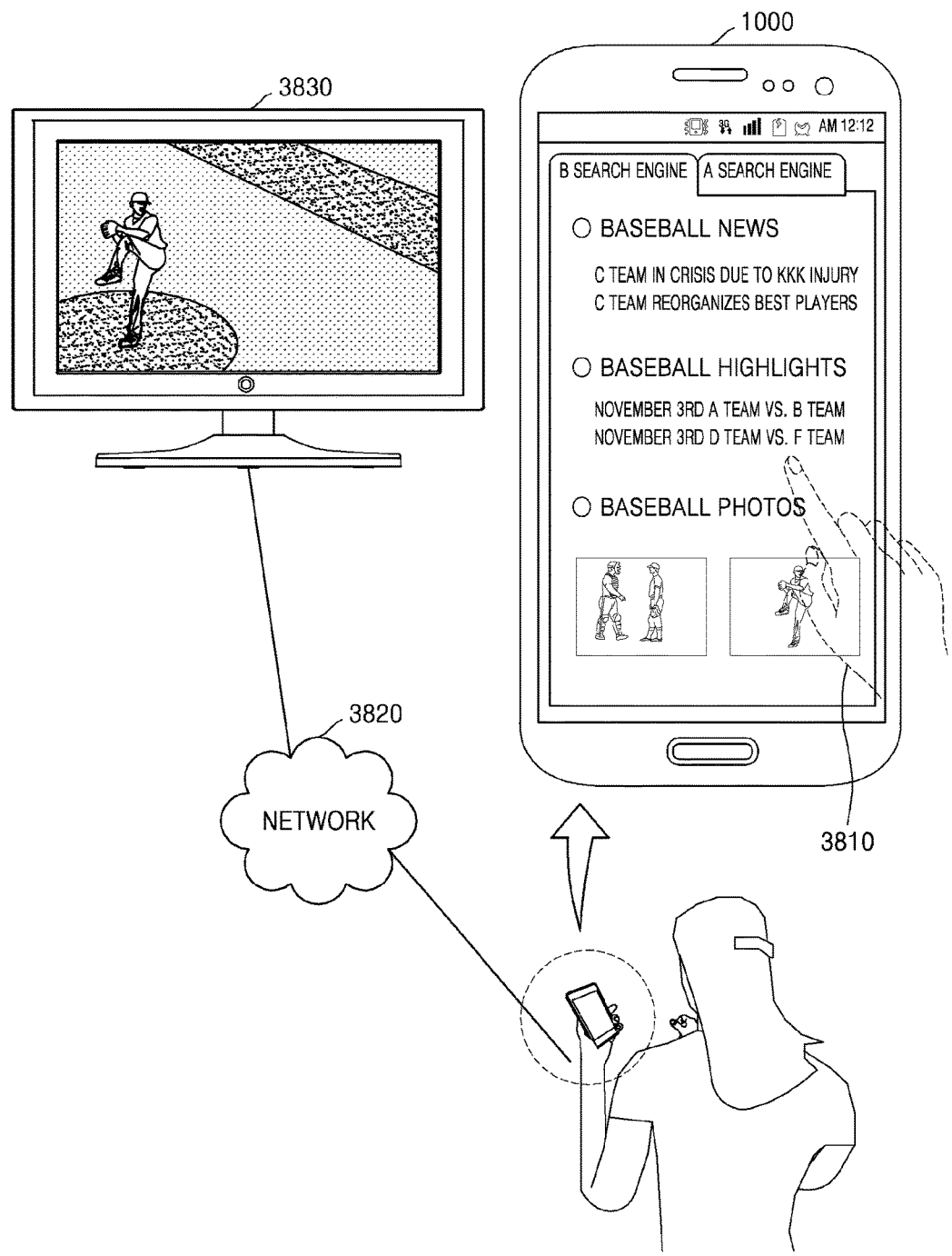

FIG. 38 is a diagram for outputting a search result to another terminal.

The terminal 1000 may transmit a search result to a terminal 3830 via a network 3820 so that the search result is provided in the terminal 3830. Referring to FIG. 38, when the user selects baseball highlights (3810), the user may set the terminal 1000 so that commands related to the baseball highlights are executed in the terminal 3830.

Figure 39:
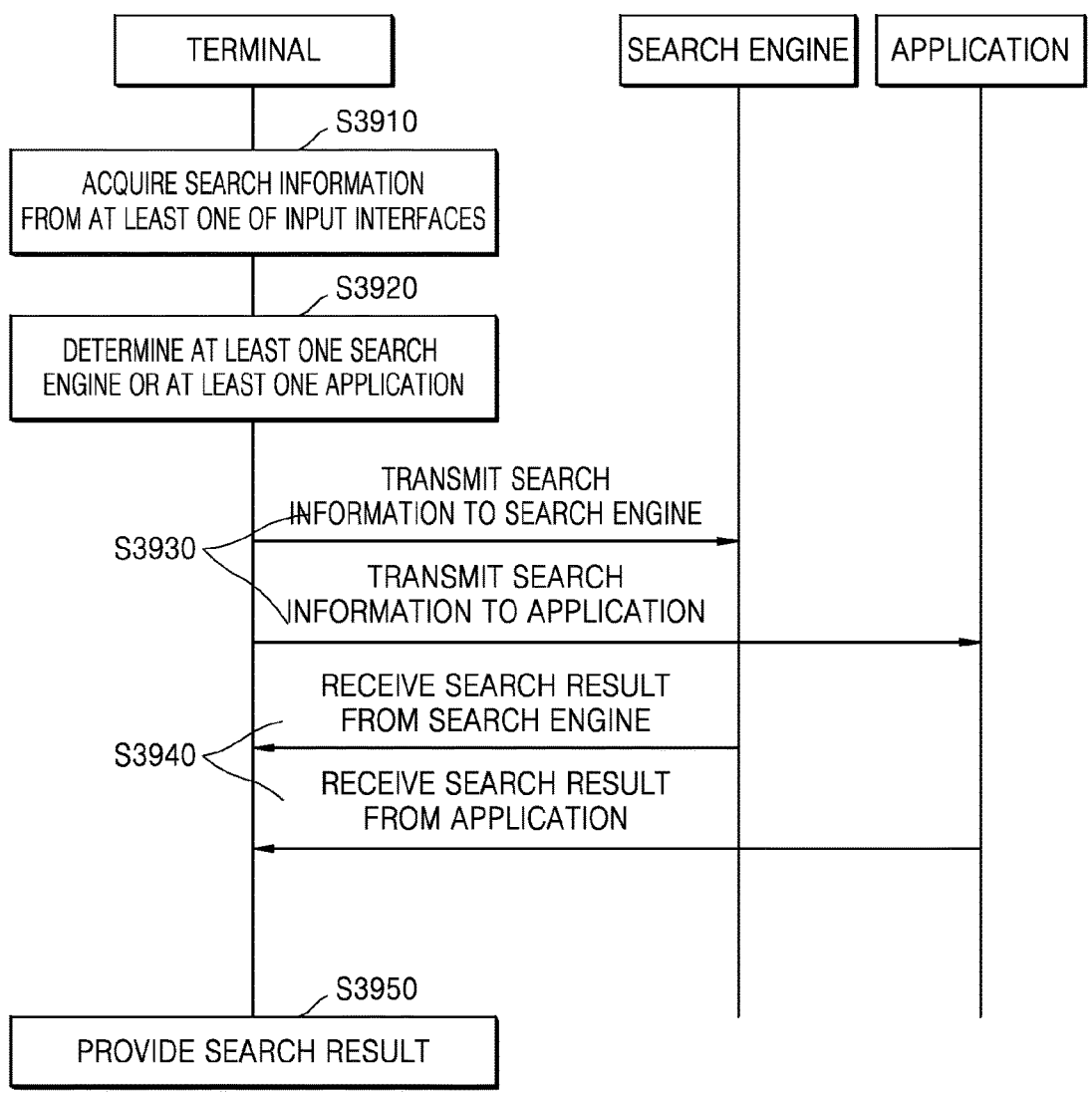
FIG. 39 is a flowchart illustrating search processes performed by a terminal, according to an exemplary embodiment.

FIG. 39 is a flowchart illustrating search processes performed by a terminal 1000, according to an exemplary embodiment.

Referring to FIG. 39, in operation S3910, the terminal 1000 may acquire search information from at least one input interface that is selected from a plurality of input interfaces. According to an exemplary embodiment, the plurality of input interfaces may include, but is not limited to, an input interface for receiving audio data, an input interface for receiving text data, an input interface for receiving image data, an input interface for receiving a touch signal, and an input interface for receiving motions.

In operation S3920, the terminal 1000 may determine at least one search engine or at least one application based on the acquired search information.

According to an exemplary embodiment, the terminal 1000 may determine a search engine or an application for searching according to a data type of the acquired search information.

According to another exemplary embodiment, the terminal 1000 may determine a search engine or an application for searching by using a category of the search information or user information of the terminal 1000.

In operation S3930, the terminal 1000 may transmit the search information to the determined search engine or the determined application.

In operation S3940, the terminal 1000 may receive a search result from the search engine or the application.

In operation S3950, the terminal 1000 may provide the received search result.

Figure 40:
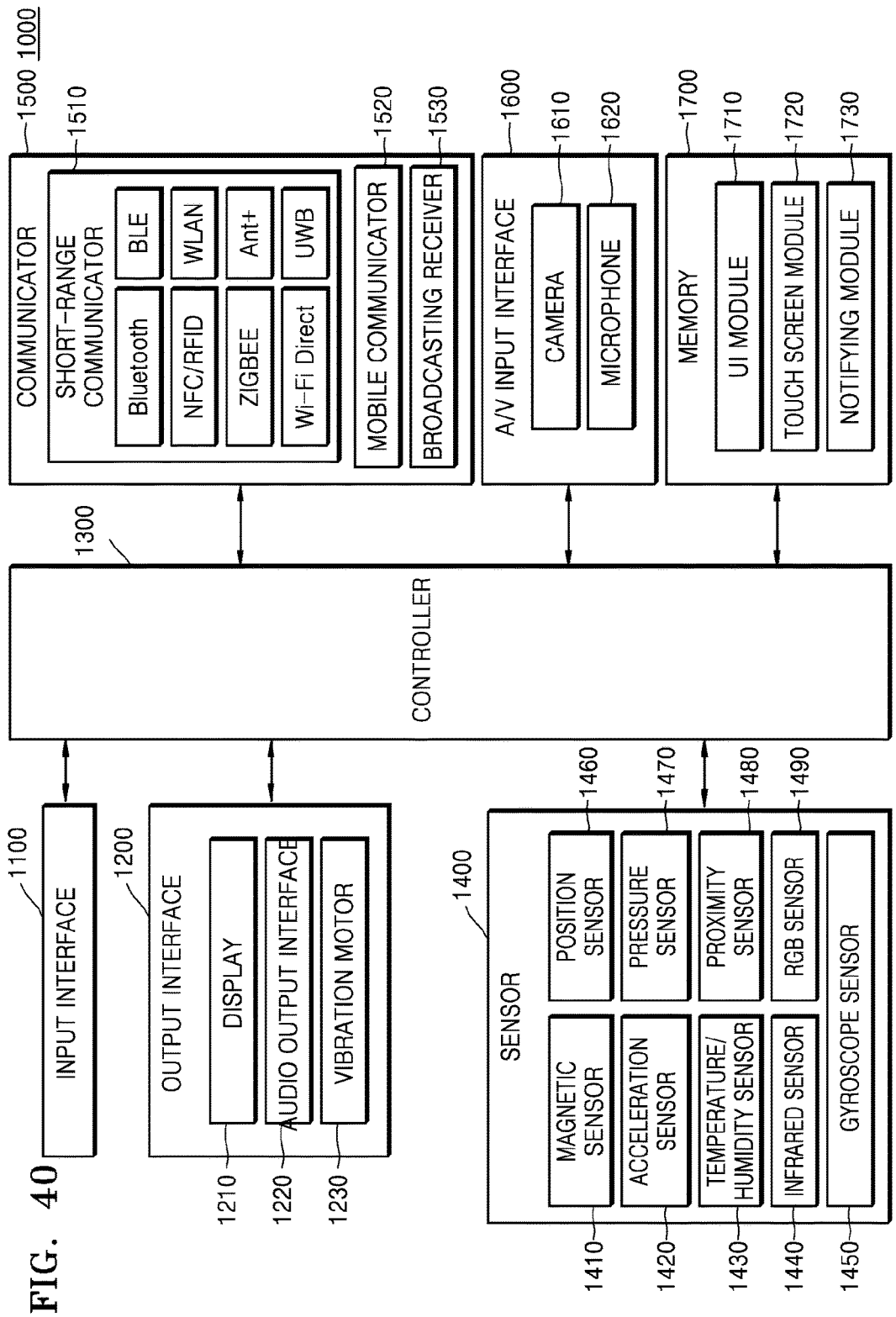
FIG. 40 is a block diagram illustrating a terminal for searching, according to an exemplary embodiment.

FIG. 40 is a block diagram illustrating the terminal 1000 for searching, according to an exemplary embodiment.

User input data for controlling the terminal 1000 is received through an input interface 1100. For example, the input interface 1100 may be, but is not limited to, a keypad, a dome switch, a touch pad, a trackball, or a jog switch. When the input interface 1100 is a touch pad, the touch pad may include, for example, a capacitive type, a resistive type, an infrared beam type, a surface acoustic wave type, an integral strain gauge type, or a piezoelectric type.

An output interface 1200 may output an audio signal, a video signal, or a vibration signal. The output interface 1200 may include a display 1210, an audio output interface 1220, and a vibration motor 1230. The output interface 1200 of FIG. 40 may be the same as the output interface 240 of FIG. 2.

The display 1210 may include at least one selected from an LCD, a thin film transistor (TFT) LCD, an organic light-emitting device (OLED) display, a flexible display, a 3-dimensional (3D) display, an electrophoretic display. The terminal 1000 may include two or more displays 1210 according to the exemplary embodiments. The two or more displays 1210 may be disposed by using a hinge such that they face each other. The display 1210 may display, but is not limited to, a user interface as shown in FIG. 7.

The audio output interface 1220 may output audio data received from a communicator 1500 or stored in a memory 1700. Also, the audio output interface 1220 may output an audio signal (for example, voice call signal reception sound, message reception sound, alarm sound) related to functions performed in the terminal 1000. The audio output interface 1220 may include a speaker or a buzzer.

The vibration motor 1230 may output a vibration signal. For example, the vibration motor 1230 may output a vibration signal corresponding to an output of audio data (for example, voice call signal reception sound, message reception sound, alarm sounds) or video data. Also, the vibration motor 1230 may output a vibration signal when a touch input is received via a touch screen.

A controller 1300 controls overall operations of the terminal 1000. For example, the controller 1300 may control components of the terminal 1000 by executing a program stored in the memory 1700. The controller 1300 of FIG. 40 may be the same as the searcher 230 of FIG. 2.

The input interface 1100 may acquire first data type search information and second data type search information. The second data type is different from the first data type. The input interface 1100 may be formed of a plurality of input interfaces. The controller 1300 may identify whether search information is acquired from the input interface 1100, and acquire a search result from data storage by using the acquired search information.

The controller 1300 may acquire search start information from at least one selected from a first input interface and a second input interface in the input interface 1100, and when the search start information is acquired, the controller 1300 may acquire search information from the at least one selected from the first input interface and the second input interface in the input interface 1100 according to the search start information.

The controller 1300 may acquire a search result by using an application corresponding to a data type of the search information. The controller 1300 may convert the search information to search information having a data type different from the data type of the search information, and acquire a search result by using an application corresponding to the converted data type. The data type of the search information may include, but is not limited to, at least one selected from text data, audio data, video data, and still image data.

The controller 1300 may determine at least one application by using at least one selected from a category of the search information and user information of the terminal 1000, and search by using the determined at least one application. The user information may include, but is not limited to, at least one selected from location information of the terminal 1000, search time information, and application usage frequency information.

The controller 1300 may determine data to be used for searching from data in the data storage, based on a mode of the terminal 1000, and may acquire a search result from the determined data. The mode of the terminal 1000 may include, but is not limited to, at least one selected from a user mode, a guest mode, a terminal lock mode, and a network use mode.

The controller 1300 may control the output interface 1200 so that the output interface 1200 provides a search result by using at least one selected from search result history information, search result information of a user other than the user of the terminal 1000, previously-used application information, user preference information of the terminal 1000, and user schedule information of the terminal 1000.

A sensor 1400 may detect a state of the terminal 1000 or a state around the terminal 1000, and transmit detected information to the controller 1300. The sensor 1400 may include, but is not limited to, at least one selected from a magnetic sensor 1410, an acceleration sensor 1420, a temperature/humidity sensor 1430, an infrared sensor 1440, a gyroscope sensor 1450, a position sensor (e.g., global positioning system (GPS)) 1460, an atmospheric pressure sensor 1470, a proximity sensor 1480, and an RGB sensor (illuminance sensor) 1490. Because respective functions of the above-described sensors may be intuitively understood by one of ordinary skill in the art by their names, detailed descriptions of the above-described sensors will be omitted.

The communicator 1500 may include at least one component to enable communication between the terminal 1000 and an external device. For example, the communicator 1500 may include a short range wireless communicator 1510, a mobile communicator 1520, and a broadcast receiver 1530.

The short range wireless communicator 1510 may include, but is not limited to, a Bluetooth communicator, a Bluetooth Low Energy (BLE) communicator, a near field (NFC) or radio-frequency identification (RFID) communicator, a wireless local area network (WLAN) or Wi-Fi communicator, a ZigBee communicator, an Infrared Data Association (IrDA) communicator, a Wi-Fi Direct (WFD) communicator, a ultra-wideband (UWB) communicator, and an Ant+ communicator.

The mobile communicator 1520 transmits or receives wireless signals to or from at least one selected from a base station, an external terminal, and a server, in a mobile communication network. The wireless signals may include data in any one of various formats according to transmission and reception of, for example, voice call signals, video call signals, and text and/or multimedia messages.

The broadcast receiver 1530 may receive a broadcast signal and/or broadcast related information from an external source via a broadcast channel. The broadcast channel may include satellite channels and terrestrial channels. According to the exemplary embodiments, the terminal 1000 may not include the broadcast receiver 1530.

An Audio/Video (A/V) input interface 1600 may receive an audio signal input or a video signal input. The A/V input interface 1600 may include a camera 1610 and a microphone 1620. The camera 1610 may receive a still image or a frame of a video via an image sensor in a video call mode or a photography mode. An image captured by the image sensor may be processed by the controller 1300 or an additional image processor.

A frame processed in the camera 1610 may be stored in the memory 1700 or transmitted to an external device via the communicator 1500. According to the exemplary embodiments, the terminal 1000 may include two or more cameras 1610.

The microphone 1620 may receive an external audio signal and process the external audio signal as electric audio data. For example, the microphone 1620 may receive an audio signal from an external device or a speaker. The microphone 1620 may use various noise removing algorithms to remove noise created during a process of receiving the external audio signal.

The memory 1700 may store programs to be processed or controlled by the controller 1300 and data that is received by or transmitted from the terminal 1000.

The memory 1700 may include at least one selected from a flash memory type memory, a hard disk type memory, a multimedia card micro type memory, a card type memory (e.g., secure digital (SD) or an xD memory), a RAM, a static RAM (SRAM), a ROM, an electrically erasable programmable ROM (EEPROM), a programmable ROM (PROM), a magnetic memory, a magnetic disk, and an optical disk.

The programs stored in the memory 1700 may be classified as a plurality of modules according to respective functions thereof. For example, the programs may be classified as a user interface (UI) module 1710, a touch screen module 1720, and a notification module 1730.

For each application, the UI module 1710 may provide a UI or a graphic UI (GUI) connected to the terminal 1000. The touch screen module 1720 may detect a touch gesture of the user on a touch screen, and transmit information of the touch gesture to the controller 1300. According to exemplary embodiments, the touch screen module 1720 may detect and analyze touch codes. The touch screen module 1720 may be separately provided as a hardware that includes a controller.

Various sensors may be provided inside or nearby a touch screen to detect a touch or a proximity touch on the touch screen. An example of a sensor for detecting the touch on the touch screen includes a tactile sensor. The tactile sensor is a sensor that senses a contact of an object and has a touch sensitivity equivalent or higher to that of a human. The tactile sensor may detect various types of information, such as roughness of a contact surface, hardness of a contact object, and a temperature of a contact point.

Another example of the sensor for detecting the touch on the touch screen includes a proximity sensor.

The proximity sensor is a sensor that detects a presence of an object approaching or nearby a predetermined detection surface by using electromagnetic power or infrared rays without mechanical contact. An example of the proximity sensor includes a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. A touch gesture of the user includes tapping, touch and hold, double tapping, dragging, panning, flicking, drag and drop, and swiping.

The notification module 1730 may generate a signal for notifying an event in the terminal 1000. Examples of the event in the terminal 1000 include call signal reception, message reception, key signal input, and schedule alarms. The notification module 1730 may output a notification signal as a video signal via the display 1210, an audio signal via the audio output interface 1220, or a vibration signal via the vibration motor 1230.

In addition, the exemplary embodiments may also be implemented through computer-readable code and/or instructions on a medium, e.g., a computer-readable medium, to control at least one processing element to implement any above-described embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A terminal comprising:
    an input interface configured to acquire text data comprising first search information;
    a camera configured to acquire video data or still image data comprising second search information;
    a microphone configured to acquire audio data comprising third search information; and
    a searcher configured to:
        identify whether any one or any combination of the first search information, the second search information, and the third search information is acquired from any one or any combination of the input interface, the camera, and the microphone, respectively;
        acquire a first search result from a first data storage, based on the first search information, in response to the first search information being identified to be acquired from the input interface;
        acquire a second search result from a second data storage different from the first data storage, based on the second search information, in response to the second search information being identified to be acquired from the camera; and
        acquire a third search result from a third data storage different from the first data storage and the second data storage, based on the third search information, in response to the third search information being identified to be acquired from the microphone; and
    an output interface configured to provide the first search result, the second search result, and the third search result that are acquired,
    wherein the searcher is further configured to acquire each of the first search result, the second search result, and the third search result, using an application corresponding to a data type of a respective one of the first search information, the second search information, and the third search information.

2. The terminal of claim 1, wherein the searcher is further configured to:
    acquire search start information from any one or any combination of the input interface, the camera, and the microphone; and
    acquire any one or any combination of the first search information, the second search information, and the third search information from any one or any combination of the input interface, the camera, and the microphone, respectively, based on the search start information that is acquired.

3. The terminal of claim 2, wherein the searcher is further configured to:
    in response to the search start information instructing to acquire the first search information from the input interface, acquire the first search information from the input interface;
    in response to the search start information instructing to acquire the second search information from the camera, acquire the second search information from the camera; and
    in response to the search start information instructing to acquire the third search information from the microphone, acquire the third search information from the microphone.

4. The terminal of claim 1, wherein the searcher is further configured to:
    convert a first data type of one among the first search information, the second search information, and the third search information that is acquired to a second data type different from the first data type; and
    acquire a new search result, based on one among the first search information, the second search information, and the third search information, of which the first data type is converted to the second data type, using a new application corresponding to the second data type.

5. The terminal of claim 4, wherein the output interface is further configured to provide the new search result that is acquired.

6. The terminal of claim 1, wherein each of the first data storage, the second data storage, and the third data storage comprises a server, and
    the terminal further comprises a communicator configured to receive the first search result, the second search result, and the third search result that are acquired, from the first data storage, the second data storage, and the third data storage, respectively.

7. The terminal of claim 1, wherein the searcher is further configured to:
    determine the application, based on either one or both of a category of the first search information that is acquired and user information of the terminal; and
    acquire the first search result, based on the first search information that is acquired, using the application that is determined.

8. The terminal of claim 7, wherein the user information comprises any one or any combination of location information of the terminal, search time information, and usage frequency information of the application.

9. The terminal of claim 1, wherein the searcher is further configured to:
    determine additional data to be used to acquire the first search result, among storage data in the first data storage, based on a current mode of the terminal, in response to the first search information being identified to be acquired from the input interface; and
    acquire the first search result from the additional data that is determined, based on the first search information that is acquired.

10. The terminal of claim 9, wherein the current mode comprises any one or any combination of a user mode, a guest mode, a terminal lock mode, and a network use mode.

11. The terminal of claim 10, wherein the searcher is further configured to acquire the first search result from public information, based on the first search information, in response to the first search information being identified to be acquired from the input interface and the current mode of the terminal being the guest mode.

12. The terminal of claim 1, wherein the searcher is further configured to control the output interface to provide the first search result, the second search result, and the third search result that are acquired, using any one or any combination of search result history information, search result information of a second user other than a first user of the terminal, previously-used application information, user preference information of the terminal, and user schedule information of the terminal.

13. A method of searching in a terminal, the method comprising:
- acquiring, by an input interface, text data comprising first search information;
- acquiring, by a camera, video data or still image data comprising second search information;
- acquiring, by a microphone, audio data comprising third search information;
- identifying, by a processor, whether any one or any combination of the first search information, the second search information, and the third search information is acquired from any one or any combination of the input interface, the camera, and the microphone, respectively;
- acquiring, by the processor, a first search result from a first data storage, based on the first search information, in response to the first search information being identified to be acquired from the input interface;
- acquiring, by the processor, a second search result from a second data storage different from the first data storage, based on the second search information, in response to the second search information being identified to be acquired from the camera;
- acquiring, by the processor, a third search result from a third data storage different from the first data storage and the second data storage, based on the third search information, in response to the third search information being identified to be acquired from the microphone; and
- providing, by an output interface, the first search result, the second search result, and the third search result that are acquired,
- wherein the acquiring the first search result, the second search result, and the third search result comprises acquiring each of the first search result, the second search result, and the third search result, using an application corresponding to a data type of a respective one of the first search information, the second search information, and the third search information.

14. The method of claim 13, further comprising:
- acquiring search start information from any one or any combination of the input interface, the camera, and the microphone; and
- acquiring any one or any combination of the first search information, the second search information, and the third search information from any one or any combination of the input interface, the camera, and the microphone, respectively.

15. The method of claim 13, further comprising:
- converting a first data type of one among the first search information, the second search information, and the third search information that is acquired to a second data type different from the first data type; and
- acquiring a new search result, based on one among the first search information, the second search information, and the third search information, of which the first data type is converted to the second data type, using a new application corresponding to the second data type.

16. The method of claim 13, wherein each of the first data storage, the second data storage, and the third data storage comprises a server, and
- the method further comprises receiving the first search result, the second search result, and the third search result that are acquired, from the first data storage, the second data storage, and the third data storage, respectively.

17. A non-transitory computer-readable storage medium storing a program comprising instructions to cause a computer to perform a method of searching in a terminal, the method comprising:
- acquiring, by an input interface, text data comprising first search information;
- acquiring, by a camera, video data or still image data comprising second search information;
- acquiring, by a microphone, audio data comprising third search information;
- identifying whether any one or any combination of the first search information, the second search information, and the third search information is acquired from any one or any combination of the input interface, the camera, and the microphone, respectively;
- acquiring a first search result from a first data storage, based on the first search information, in response to the first search information being identified to be acquired from the input interface;
- acquiring a second search result from a second data storage different from the first data storage, based on the second search information, in response to the second search information being identified to be acquired from the camera;
- acquiring a third search result from a third data storage different from the first data storage and the second data storage, based on the third search information, in response to the third search information being identified to be acquired from the microphone; and
- providing the first search result, the second search result, and the third search result that are acquired,
- wherein the acquiring the first search result, the second search result, and the third search result comprises acquiring each of the first search result, the second search result, and the third search result, using an application corresponding to a data type of a respective one of the first search information, the second search information, and the third search information.

* * * * *